INVENTOR
Donald F. Othmer

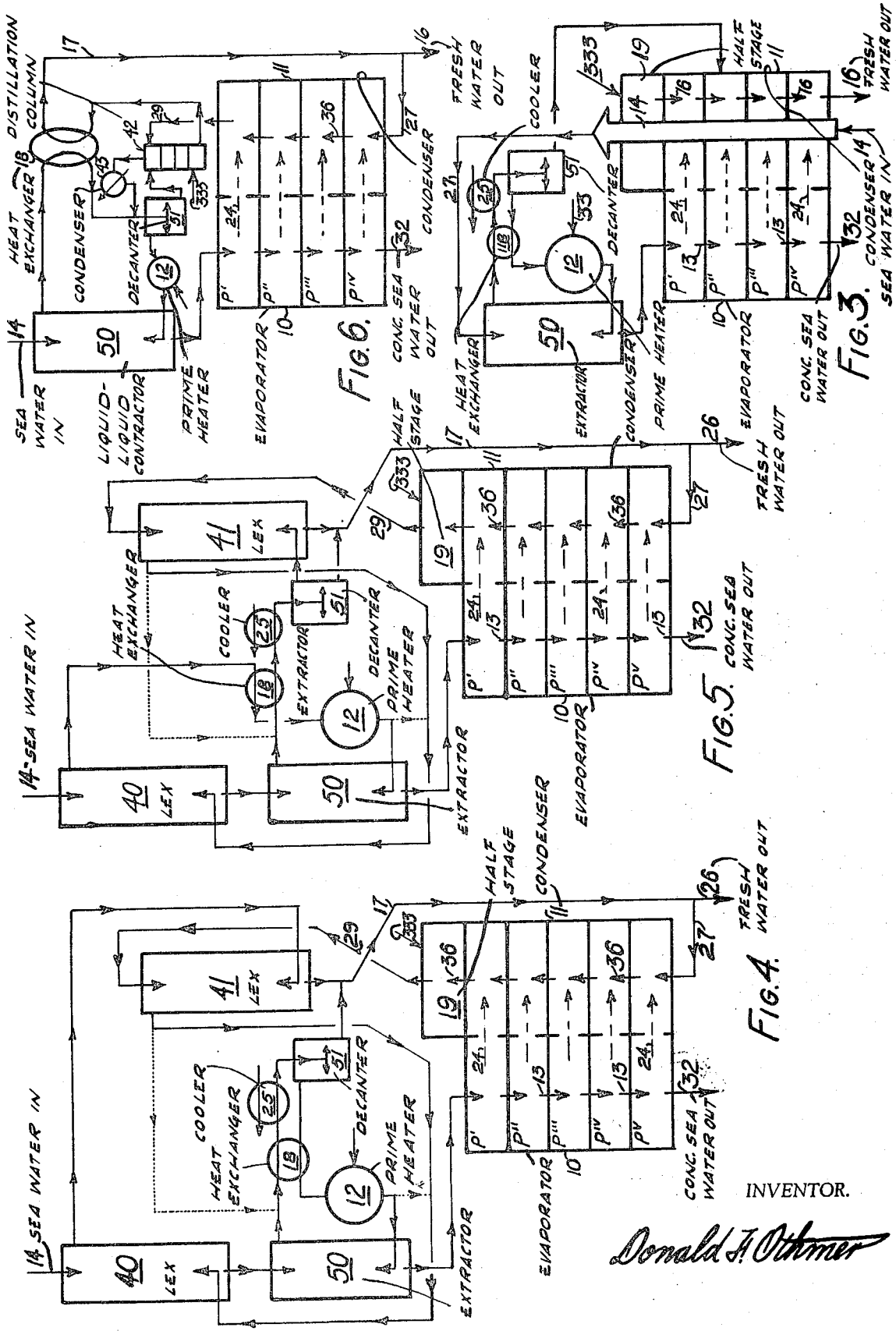

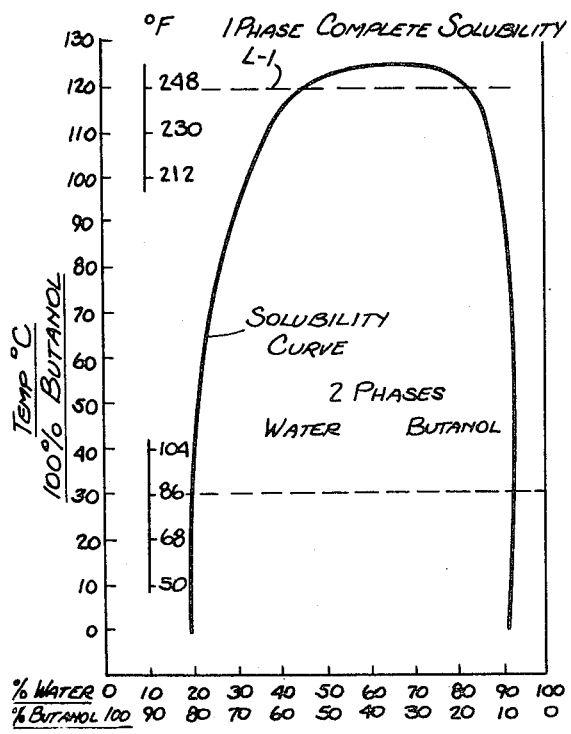
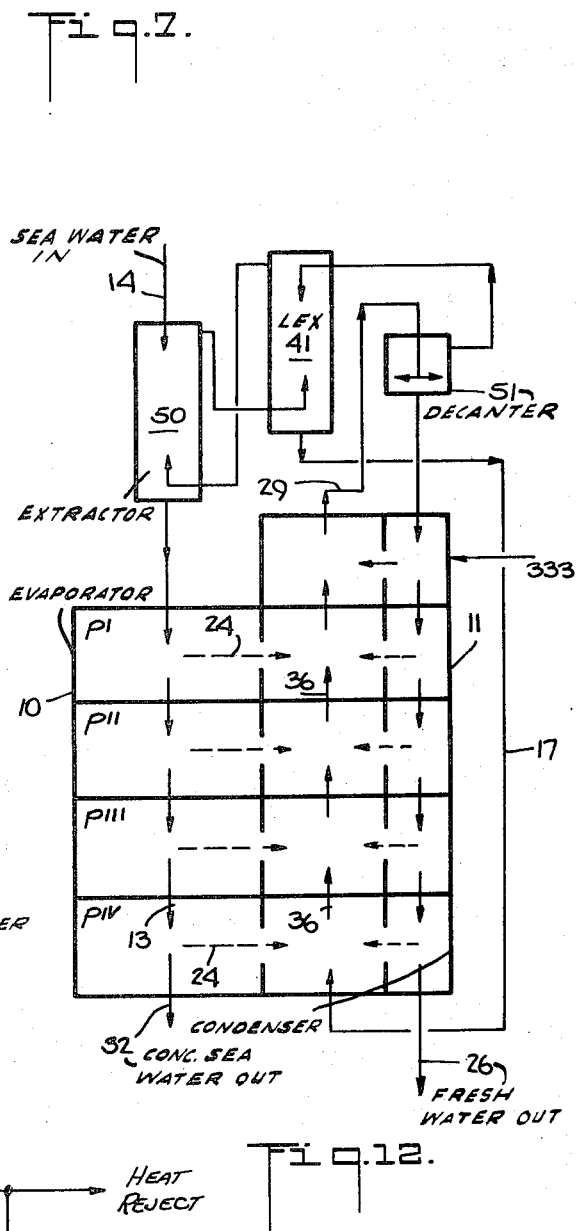
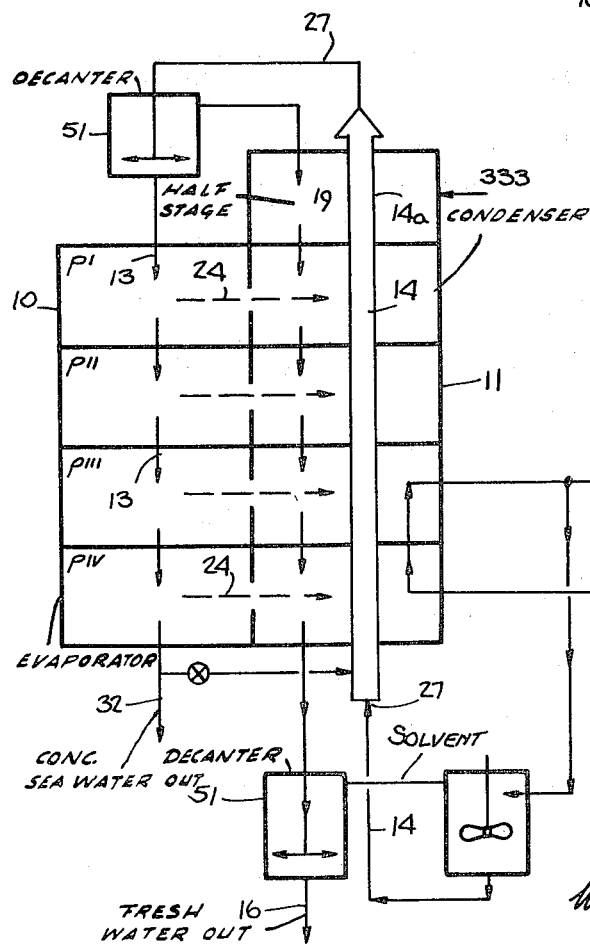

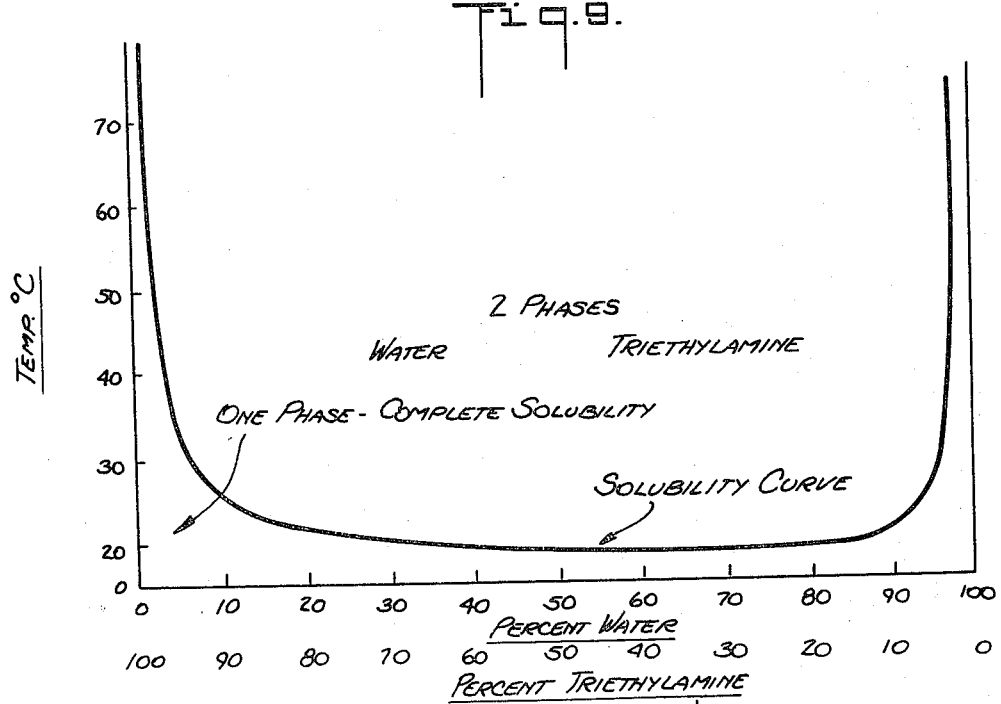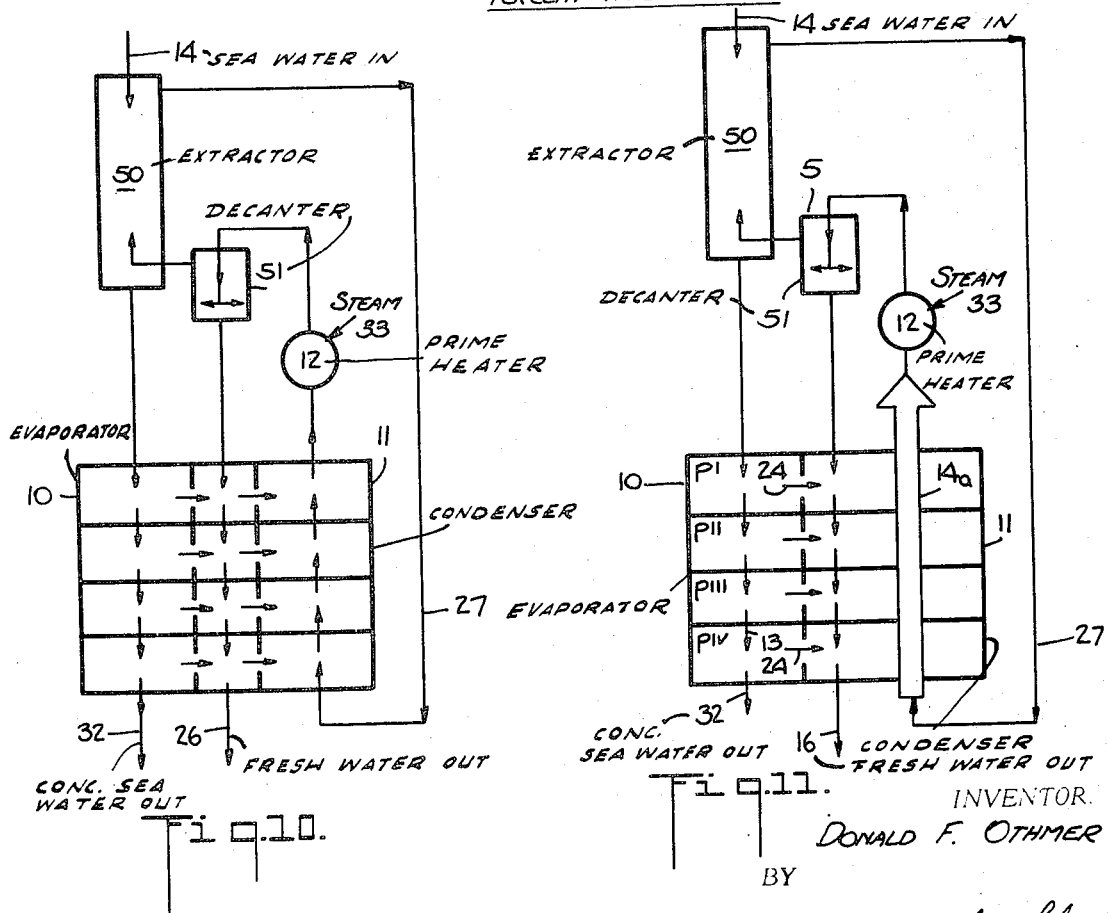

United States Patent Office 3,692,634
Patented Sept. 19, 1972

3,692,634
METHOD FOR PRODUCING PURE WATER FROM SEA WATER AND OTHER SOLUTIONS BY FLASH VAPORIZATION AND CONDENSATION
Donald F. Othmer, 333 Jay St., Brooklyn, N.Y. 11201
Continuation-in-part of application Ser. No. 826,135, May 20, 1969. This application May 7, 1970, Ser. No. 35,485
Int. Cl. B01d 3/10
U.S. Cl. 203—11                           35 Claims

ABSTRACT OF THE DISCLOSURE

Various liquid solutions with or without fine suspended particles may be purified by: (a) flash evaporation for cooling the heated dilute solution; after (b) a process which may be physical or chemical; preceded by (c) a preheating of the liquid solution using the heat of condensation of the vapors from (a). The process may be an extraction, a precipitation of a solid at a high temperature, or a chemical reaction; e.g., a submerged combustion which may supply the required external heat by oxidation with added air or oxygen of either a fluid fuel or combustible organic material dissolved or suspended in the solution. Purification here may be by removing impurities by combustion or other chemical action or by extracting or distilling some of the water from the dilute solution.

---

This is a continuation in part of my application Ser. No. 826,135, filed May 20, 1969, which is a continuation in part of my application Ser. No. 639,989, filed May 22, 1967, and issued as U.S. Pat. No. 3,446,712 on May 27, 1969 which was a continuation in part of my application Ser. No. 252,473, filed Jan. 18, 1963, issued July 4, 1967 as U.S. Pat. 3,323,583, all having the same titles as this application.

This invention relates to a method of conducting a physical or chemical process at a high temperature with or in a dilute aqueous solution such as, particularly, sea water, waste pulp liquors, sewage and sludges therefrom, then conducting a multi-stage flash-MSF-evaporation of part of the water of the dilute solution to cool it, while heat of condensation of the vapors from the MSF is preheating the solution itself.

As described in co-pending application Ser. No. 639,-989, now U.S. Pat. No. 3,446,712 vapors from an MSF may heat the feed liquor; (a) by condensing on surfaces of preheating tubes; or (b) by condensing on a stream of recycling condensate water in open flow, which is cooled in one part of its cycle by heat exchanging with the cold feed. This invention provides a third method (c) by condensing on a stream of the feed liquor itself in open flow.

Suspension-solutions of solid organic matter are included in the term solutions since usually some solubility exists; and even if not, suspensions of small particles of organic materials to be separated as impurities are treated as solutions in the practice of this invention.

Specifically, the method flash evaporates water from an aqueous solution in a series of steps which may comprise, besides other steps of the conventional MSF or the vapor reheat MSF evaporation, as described in part in co-pending application No. 639,989, now U.S. Pat. 3,446,712.

(a) Heating the dilute solution under pressure at least equal to its saturation pressure by prime or outside heater, with sufficient time allowed at the high temperature to conduct the desired process, e.g., (i) a submerged combustion of a gaseous or liquid fuel and air or oxygen; (ii) an aqueous phase combustion of organic materials present in the dilute solution itself with added air or oxygen; (iii) a precipitation of solids at a high temperature because of normal insolubility, or because constituents of the solution change to less soluble forms at the high temperature by combination with each other, or with added chemical materials; or (iv) a solvent extraction of water away from the impurities, or the impurities away from water, which extraction is practical between the high temperature of the prime heater, and the low temperature of the original dilute solution, due to the solubility for water of the solvent being greater when hot, or greater when cold.

(b) MSF evaporation of the liquid discharged from the prime heater or the high temperature processing vessel in a plurality of stages at successively lower pressures to give water vapor which is condensed in respective condensing zones in the stages to heat (i) the dilute solution flowing counter-currently in tubes through the condensing zones, (ii) a cycling stream of condensate in open dispersed flow which, by subsequent heat exchanging, heats the dilute feed; or (iii) the dilute liquid itself in open dispersed flow;

(c) Evaporating a small amount of the dilute solution in the prime heater; the water vapor formed heating the dilute solution to a higher temperature than exists in any of the flash evaporation, in what is called in U.S. Pat. 3,329,583 a "half-stage";

(d) Compressing vapors withdrawn from one of the lower stages by a mechanical or absorption system as described in U.S. Pat. 3,288,684 to a pressure at least as high as that of the half-stage or of the prime heater to use as the source of prime heat.

Water is the usual liquid in dilute solutions or suspensions of finely particulated solids which is to be purified either by distillation or by chemical action at elevated temperatures of impurities after heating and before cooling by the method herein described. However, other liquids may also be purified in the same manner. Sea water often is used as a type of dilute aqueous solution, but the method is not limited to it or to other saline waters, although sea water may be referred to hereinafter as a general example of a dilute solution. Wastes such as sewage or flowable sludges coming from sewage treatment, black liquors from pulping wood to make paper, and other wastes from food and other industries, may be handled.

The production of distilled or twice-distilled water of water purified by removal of impurities therefrom, of concentrated solutions, of products separated after chemical treatment, of steam for other uses, and of power—all are possible with different embodiments of this methods. The particular dilute solution to be processed and the chosen combination of the steps of this invention—all of which are done in known types of equipment determines the end products.

Solutions and suspensions in flowable form of inorganic or of organic materials, or of both, may be processed by methods to be described; particularized for the liquid to be processed, the reasons for processing, and the products desired. Thus, a solution of black waste sulfite liquor from a pulp mill has much different possible products than a saline water, also quite different properties including a much higher elevation of boiling point, which is always important in any evaporation method. These waste sulfite liquor, for example, may give distilled water, doubly-distilled water, concentrated solution, water from which the organics have been wet-combusted or partially wet combusted to give reusable water with some of the inorganics dissolved therein, also heat and power from the combustion. As another example, an aqueous slurry of sawdust or wood flour may have much of the readily hydrolyzed and oxidized components of the wood wet-combusted to leave a particulate charcoal or activated carbon; or a slurry of such an activated carbon or other particulate activated material which has been used to adsorb various organic impurities during either a liquid phase or a vapor phase exposure to such impurities may have the impurities wet-combusted off the active sites of the carbon or of other particulate activated material to reactivate it. Other liquids, when worked under different conditions with this method, give other products.

Direct contacting of liquids to exchange heat between hot and cold aqueous streams is well known. A water insoluble liquid, the carrier of heat, is contacted with each stream separately. In this, the LEX system, LEX–1 is the contactor for the cold aqueous stream with the immiscible liquid, and LEX–2 for the hot aqueous stream. Each LEX is similar to a liquid-liquid extractor. In the present invention, both the heat transfer function of the LEX and the mass transfer aspect of an extractor are utilized in the same operation and piece of equipment. Also known are systems wherein solids take heat from one hot fluid stream and give it up to a cold fluid stream. These solids may be in a mechanical system as a thermal wheel, or they may be particulate solids in fluidized or other beds. Such solid or liquid heat transfer system may be used in this invention.

FIGURES

The figures are diagrams of fluid flow, are not to scale, and do not represent any particular types of equipment. Pumps, valves, intermediate storage tanks and other usual accessories are not shown, nor are certain standard parts of MSF systems such as deaerators, reflux systems, conventional heat reject systems, etc.

FIG. 1 is a schematic diagram of a system of heating a dilute solution in a prime heater to the desired temperature for the particular process to take place, cooling the solution by an MSF evaporation, which gives water vapors which are used to preheat the dilute solution. This illustrates open condensation of the water vapors in the feed solution itself in open, dispersed flow. The comparable processes of co-pending application 639,989, now U.S. Pat. 3,446,712 are also understood from this figure, particularly also by reference to the other figures, as noted thereunder. They include (a) the closed condensation of the flash vapors on tubes carrying the dilute solution through the condensing zones; and (b) the open condensation of the flash vapors in an open stream of recycling condensate water which is chilled by giving up its heat to preheat the feed.

FIG. 2 is a schematic diagram of an MSF evaporator with open condensation zones and a prime heater as a processing unit between its evaporation and condensing side, coupled with a known type vapor reheat MSF evaporator, wherein the flash vapors are condensed in an open stream of condensate water.

FIG. 3 is a schematic diagram of a conventional MSF evaporator with closed condensation, e.g., vapors from the MSF are condensing on tubes through which circulate the dilute solution being preheated. An extraction process with a solvent in which water is more soluble at elevated temperatures concentrates the feed by removing water from the solvent, now saturated with water; and there is also required as part of this process: heat interchanging, cooling, and decantation.

FIG. 4 is a schematic diagram of a vapor reheat MSF evaporator using as an example a liquid-liquid-liquid heat exchanger between the hot condensate stream and the cold dilute feed. An extraction process with a solvent in which water is more soluble at elevated temperatures concentrates the feed by removing water from the solvent, now saturated with water; and there is also required as part of this process heat interchanging, cooling, and decantation. The solvent operates in parallel through the liquid-liquid-liquid heat exchanger and through the extractor.

FIG. 5 is a schematic diagram of a vapor reheat MSF evaporator and extraction process at the highest temperature, as in FIG. 4. Here, however, the solvent operates in series through the liquid-liquid-liquid heat exchanger and through the extractor.

FIG. 6 is a schematic diagram of a vapor reheat MSF evaporator using as an example a surface heat interchanger to remove the heat from the hot condensate phase so as to add it to a cold solvent stream. A liquid-liquid contacting with this solvent in which water is more soluble at lower temperatures concentrates the feed by extracting water therefrom, while preheating the feed in the same contacting with the solvent. The solvent heated in the heat interchanger separates out the water dissolved at the lower temperature in a decanter; and the solvent stream is recycled through a prime heater back to the liquid-liquid contactor. The decanted water is stripped of the solvent with which it is saturated, cooled in the heat interchanger, and recycled to the condensing side of the vapor reheat system.

FIG. 7 illustrates a phase diagram for a water/n-butyl alcohol system over a temperature range from 0° C. to approximately 130° C., the n-butyl alcohol being advantageously adapted for use as a solvent in connection with "hot" extracting processing i.e., wherein the solubility of water in the solvent is greater at higher temperatures.

FIG. 8 illustrates diagrammatically a system applicable to the use of n-butanol as solvent, including an evaporator unit provided with two sets of flashing stages connected in parallel to supply vapors to common condensing tubes, the feed solutions to the flashing stages comprising respective brine and fresh water-saturated solvent layers drawn from a hot decanter.

FIG. 9 illustrates a solubility diagram for a triethylamine-water system, the triethylamine being representative of solvents of the "cold" extracting type i.e., in which water is markedly more soluble at lower temperatures.

FIG. 10 illustrates diagrammatically an apparatus adapted for use with solvent of the "cold" extracting type, provision being made for open condensing of vapors from the flashing stages, such system being beneficially adapted for use with volatile solvents having little appreciable solubility in water.

FIG. 11 illustrates apparatus similar to that of FIG. 10 except in the FIG. 11 apparatus condenser tubes are provided for condensing the vapors from the flashing stages.

In the apparatus arrangement illustrated in FIGS. 10 and 11, the vapors from the MSF vaporization zones serve to preheat the solvent which is further heated in the prime heater to maximum temperature to accomplish separation of water and solvent.

FIG. 12 illustrates a further arrangement of apparatus suitable for use with solvents of the "cold" extracting type, with LEX units being employed for accomplishing liquid-liquid heat exchange/extraction and liquid-liquid heat exchange/decanting operations respectively.

FLOW SHEETS SHOWN IN FIGS. 1 AND 2

Figure 1:
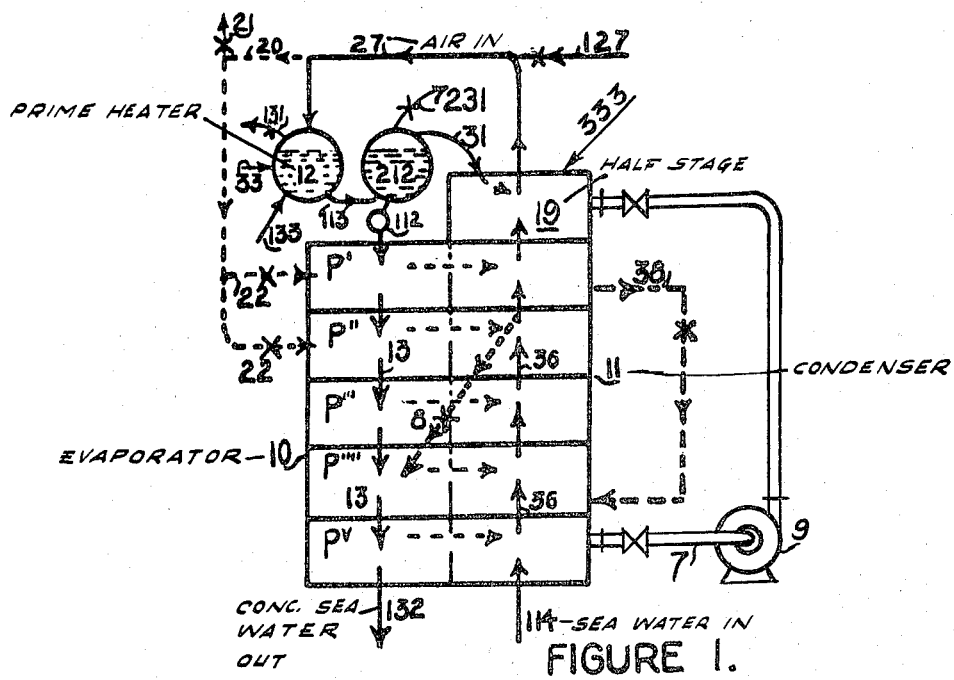

FIG. 1 is a flow sheet of an embodiment of the invention in which the main purpose of the MSF evaporation for cooling, and the condensation for heating, may not primarily be to concentrate the solution, but rather to heat it for a process—either a physical operation or a chemical reaction by or within the solution—and to cool it thereafter. MSF evaporation on the left side, 10, of the ladder of stages concentrates the solution as described in co-pending application 639,989, now U.S. Pat. No. 3,446,712. The vapors so formed in each respective flash evaporation stage may be condensed on (a) heating tubes, not shown, for the dilute solution, (b) a recycling stream of condensate in an open counter-current flow through the several stages, which is heated and then, in a heat exchanger, not shown, is cooled as the feed is preheated, or (c) the dilute feed liquid itself in open counter-current flow through the stages.

FIG. 1 shows a direct method of preheating the dilute solution feed in open flow, with a large amount of surface open to the condensing vapors. The solution enters at 14 and passes through the condensing zones of the successive stages. Open flow is indicated in each condensing zone by the discharge lines, 36, to the stages. The half stage 19, is indicated as another heating zone supplied with vapors from the prime heater 12, through line 31, but the half stage may or may not be used in a particular case. Prime heat may be supplied in whole or in part of the required heat, by boiler steam passing to the half stage 19, through the line 333, or to the prime heater as a separate vessel, 12, through the line 33. Alternately, prime heat may be supplied by the submerged combustion of a fluid fuel with oxygen or air, both supplied from the outside. In another example, if combustible organic materials are in the solution, either in suspended or dissolved, solid, or liquid form, these may be oxidized in a wet combustion simply by the supply of oxygen or air for combustion in the liquid phase.

Oxygen or air may be supplied at a pressure higher than the saturation pressure of water at the temperature in 12, by either line 127 to line 27, or in line 133 to the prime heater 12, which in this case is also a reactor. The line 27 in this figure may feed to the bottom or side of the prime heater 12, which may be a horizontal or vertical cylindrical vessel designed for the operating conditions. In many cases, there may be not only a large amount of heat and then steam formed due to the combustion of either the external fuel supply or the combustibles in the dilute solution. Also, there will be products of combustion and any other gases of chemical reactions which may be removed in the vapor line 131. These vapors and gases, along with steam, at the high pressure of the prime heater, will develop power, as in the expansion cylinder 67 and motor-generator 69 of FIG. 2, as described below; or by a turbine. All or some part may be passed through, or by-passed around the combustion gas cooler 68 or FIG. 2 which may also be used.

Other chemicals may be added through lines 127 or 133 for the main chemical reaction with a component of the solution, or for an ancillary reaction. Thus, an alkali added to 127 will neutralize acetic and other acids while being formed during wet combustion. If added to 133, neutralization is after the reaction. In some chemical reactions, it may be desired to add an acidic material, as HCl, $SO_2$, or $SO_3$. Particularly a sulfur oxide may be added in those operations recovering solutions (Black Liquors) from the pulping of wood, wherein $SO_2$ or $SO_3$ unites with the alkalies present to give the desired concentration and pH of the liquor for the pulping system.

Steam free of non-condensible gases is usually desired. The minimum possible amount of steam may exhaust substantially all of the gases in line 131; and the hot liquid passes from the bottom of 12 to a second vessel 212, at a somewhat lower temperature and pressure. Here, it flash evaporates to give almost pure steam in line 231 for external use, while some steam passes through line 31 to the half-stage 19, if used. Substantially 212 and 19 form two halves of a single top stage, with steam being withdrawn from the system; but the design differs from other stages because of additional functions.

One chemical reaction is the precipitation at a high temperature of certain salts, such as those which give boiler scale, as indicated in U.S. Pat. 3,408,294, also a continuation of the parent application, Ser. No. 252,473, filed Jan. 18, 1963, which is now U.S. Pat. 3,329,583. Suitable chemicals added through 127 or 133 may aid that process. The essential heating and cooling is done, however, by the present method of vapor reheat with direct condensation of vapors on the dilute liquid in open, dispersed flow.

The processing vessels, either 12 or 22, or both, are designed of sufficient size in respect to the amount of liquid flow to allow suitable residence time for the desired physical or chemical process—in many cases one to several minutes; in other cases an hour or even two hours.

Solids may form in the reaction, e.g., the precipitation of scale-forming materials according to the reaction of U.S. Pat. 3,408,294. They may be removed by any suitable filter device indicated as 112. Usually 112 will not be required; and the hot liquid having accomplished its chemical reaction and now being chemically treated in the reactor, passes to the high temperature flashing zone P', P'', P''', P'''', and finally $P^v$. A larger or smaller number of stages than five may often be more desirable, and the optimum number may be determined in advance through usual design calculations.

Either scale or other solids which form due to a chemical reaction or are less soluble at higher temperatures, may be removed from solution. The liquid is cooled by MSF evaporation; and the vapors formed pass to respective condensing zones, wherein they condense either on metallic surface or on a stream of liquid in open, dispersed flow.

For purposes of economizing on heat which otherwise might be rejected, in balancing the heat given in the flash evaporation vapors in the evaporation side 10, and absorbed in the condensation side 11, of the ladder, there may be utilized the method for preventing the loss of heat otherwise rejected, as described in co-pending application Ser. No. 639,989, now U.S. Pat. 3,446,712. This would be indicated by the line 20, as before, to allow by-passing of liquid around the prime heater, and thence entering at a stage 2 to 10 below the top, or where its temperature may be nearest that of the temperature of the stage it enters. Similarly, the valved line 8, as in FIG. 1, may allow the withdrawal of a small part of the feed stream after it has passed 2 to 10 condensing stages of the right side 10 of the ladder. This allows another method of recovery of heat otherwise rejected by passing to the flash evaporating zone of a stage 2 to 10 lower, where the temperature is somewhat lower. In this particular utilization of this principle of recovery of heat otherwise rejected by the use of either of the lines 22 or 8, there may be chemical advantages in some cases of the by-passing of a part of the solution around the major part entering the prime heater and the reactor.

As noted above, the heating is being accomplished in the right side of the ladder as the liquid rises from stage-to-stage while the liquid, after the reaction at the high temperature, is being cooled. Also, additional chemicals may be added through a connection to 11, the right side, or 10, the left side, if desired to treat the liquid during the heating-processing, or after the heating-processing, before discharge. Such connections are not shown.

FIG. 1 may also be consideres as the conventional MSF flow sheet for using a closed condensation of the steam formed in each of the MSF evaporations to preheat the feed liquid entering the respective stages through the lines 36. The lines 36 connect through closed condenser tubes from stage to stage, and this closed condensation as in the usual MSF system produces distilled water condensed on the tubes. A separate figure is not needed to delineate this system, although FIG. 3 will be described below as representing such a system for one of the useful applications of this invention, and the MSF ladder of stages in FIG. 3 may be substituted for the one of FIG. 1.

Also, FIG. 1 may be viewed as representing the flow diagram wherein condensation of vapors is in a stream of condensate recirculated, as in the typical vapor reheat process of application No. 639,989, now U.S. Pat. 3,446,-712. A heat exchanger transfers the heat of condensation to preheat the dilute feed. Other and better representations are those of the vapor reheat system in FIGS. 4 and 5 below, and the vapor reheat ladder of either FIG. 4 or 5 may be substituted for the ladder of FIG. 1.

Boiler steam or other heating fluid supplied through line 33 is usually the most convenient source of heat when external heat is to be supplied to 12. Alternately, boiler steam may be added by line 333 to the half-stage 19, as in FIGS. 4 and 5 and U.S. Pat. 3,288,686. Usually in an aqueous system, the steam may be condensed by direct contact with the colder process liquid; but closed condensation on a heat transfer surface may also be used, as in the case of FIG. 3.

The external energy may be supplied instead by thermocompression, as shown by the connections on the right of FIG. 1. (Valves indicate that this is an alternate system.) Vapors may be taken from the condensing zone of a stage of low or lowest pressure, $P^v$, by line 7 and be compressed by mechanical compressor, 9, or by an absorption system of U.S. Pat. 3,288,686, to the higher temperature and pressure of the half-stage 19, as shown in FIG. 1; or to the pressure of the prime heater-reactor 12 (connections not shown). These compressed vapors may pass to condense by direct contact with the liquid in 12 or 19; or they may transfer their heat to the solution in condensing on the surface, of a tubular heater if the liquid is not to be diluted.

While FIG. 1 indicates the prime heater consists of two vessels, 12 and 212, in many cases (as in FIG. 2, vessel 60) a single unit may suffice, particularly if there is no need to separate non-condensible gases from steam which may be generated. Thus, in FIG. 1, vessel 212 might be eliminated, liquid line 113 might connect directly into 112, the filter or chemical treating vessel, or pass immediately into the top flash stage with pressure P′, if 112 is not needed. Also, some or all of vapors, or vapors mixed with non-condensible gases, in line 131, might be passed into the half-stage 19 through line 31. (The half-stage, as all condensing stages, would always have to have provisions for eliminating non-condensible gases.)

It is obvious that the flow sheet FIG. 1 might be superimposed directly on the top of a conventional MSF evaporation ladder, eliminating its prime heater. The preheated liquid from the top stage of the conventional MSF ladder (closed condensation) might enter into line 114 of FIG. 1. The outlet 132 of FIG. 1 would then supply hot liquid to the top stage of the conventional multi-stage flash evaporation. Similarly, FIG. 1 could be superimposed on the top of a vapor reheat ladder of stages.

One reason for the use of such a system as FIG. 1 superimposed on an MSF ladder—either conventional or vapor reheat—would be that there might be required a chemical treatment such as a combustion; and the heat of reaction of the available combustibles might give more vapors than would be required for the desired amount of production of fresh water. Another reason might be that the upper stages, such as those of FIG. 1, above either a conventional or a vapor reheat MSF, would have certain vapors from material formed in the chemical reaction, which would impair the quality of the fresh water which was being produced, if the operation was to be conducted as merely an elongation or increase in the number of stages of either a conventional or a vapor reheat MSF evaporation.

However, a parallel arrangement may be used instead of a counter-current arrangement of FIG. 1 being above either a conventional or a vapor reheat MSF ladder of stages. Such a parallel arrangement is shown in FIG. 2, wherein the flow sheet of FIG. 1 of heating-reaction-cooling is indicated as operating with a part of the hot liquid from the prime heater or reactor, while another parallel flow of part of the hot liquid goes to a vapor reheat MSF evaporation ladder.

Figure 2:
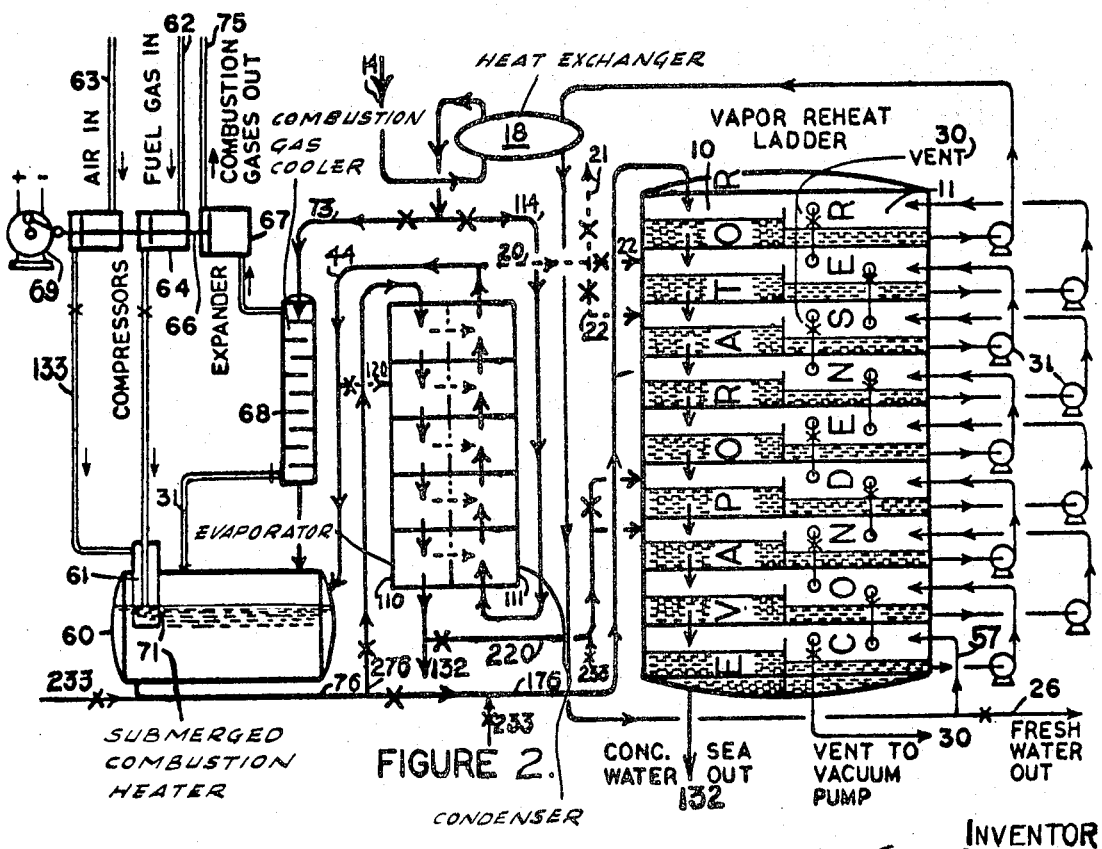

FIG. 2 is thus a combination of the flow sheets of FIG. 1 with that of a vapor reheat ladder of stages, with two uses of the open flash evaporation—open condensation system. The prime heater is also a reactor, similar to the description of FIG. 1. Its discharged hot solution is divided: partly in series with a vapor reheat evaporator for production of fresh water, and partly back to its own ladder of stages for preheating by open condensation on the dispersed feed liquid. The hot condensate from the vapor reheat evaporator passes through the usual heat exchanger, 18, for preheating the feed stream, 14, while the hot mixture of condensate and feed from the open condensing stages of 111 passes directly through line 44 to the prime heater-reactor.

In this case, the dilute solution comes in at 14, passes through a counter-current heat exchanger 18. A bypass may be made, 73, of some part of the dilute feed, either before or after the heat exchanger, to be used as cooling fluid for the combustion gas cooler, 68. This may or may not be desired, because if the combustion gases together with steam are to be used in ap rime mover, the removal of the steam by condensation may not be advantageous.

The dilute solution after passing the heat exchanger 18 of the vapor reheat ladder passes line 114 and enters the right side 111 of the direct heat ladder. It passes up in open flow through the condensing zones of the stages heated by steam from the left side 110, the evaporating side of the stages, and discharges through line 44 to the prime heater 60. A by-pass line 20 may take part of this stream for recovering heat otherwise rejected to the vapor reheat evaporator to the stages through valved inlets 22, or to discharge in 21. A similar valved line 120 may allow feed into the left side 110, to allow a by-pass around the prime heater for saving of heat otherwise rejected into the left side of this flash evaporator-heater. The discharge from the prime heater-reactor 60, after suitable time of retention for the chemical reaction, passes through line 76 with by-pass arrangements so that a part may pass through line 176 into the vapor reheat ladder or through line 276 into the top flash chamber of left side 110 of the flash evaporator-heater.

Discharge from the flash evaporator-heater through valved line 132 may discharge from this system, or through the valved line 220 into the vapor reheat ladder at a temperature near to the temperature in the stream on the left side 10 of this ladder, which will be considerably lower than the temperature of the stream in 176 entering the top.

FIG. 2 does not show the half-stage on top of the right side 111 of the flash evaporator-heater, as shown in FIG. 1, and as sometimes may be desirable. Neither does it show inlets for chemicals nor provision for filtering at any one of the several points where such may be desirable. Particularly, it may be desirable to add chemicals, by inlets, 233, in line 76, line 176, or line 220.

Addition of alkali such as sodium hydroxide or other suitable alkaline material will unite with any volatile acids if such are formed as in wet combustion of the organic materials in the prime heater-reactor 60 in sewage or black liquors from wood pulping process. Such volatile acids will evaporate with the vapors from the left side of flashing stages, and condense in the condensing zones to give water with slight acidity.

The addition of caustic soda, milk of lime, or other alkali for neutralization removes such volatile acids as the corresponding salts which are not corrosive and which reduce considerably further oxidation of the acid radical. Thus, in some cases, an impure solution of sodium salts of such organic acids, principally acetic, may be the product withdrawn from line 132 of FIG. 7 or 76 of FIG. 2. These may be worked up for their industrial values by known means.

Similarly, in those cases where amines or other volatile alkaline compounds are formed by the chemical reaction, it may be desirable to treat with a small amount of sulfuric or other strong non-volatile acid added at any one of the lines 22 to remove such contaminants of the vapors formed in the MSF evaporator.

While the heat exchanger, 18, of FIG. 2, or a comparable one which might be used in FIG. 1 may be of tube and shell or other standard design, or one using particulate solids in a fluidized bed or otherwise, it might be, instead, one of the types described in the parent application 252,473, now U.S. Pat. 3,329,583: (a) liquid-liquid-liquid heat exchanger, or (b) flash chilling to produce twice-distilled water.

While both MSF evaporation ladders—the higher temperature one (left or evaporation side 110, and right or condensation side 111), and the lower temperature one (left or evaporation side 10, and right or condensation side 11)—are described above as being of the open condensation or vapor reheat type, FIG. 2 may also represent either or both ladders as being of the conventional MSF evaporation type with closed condensation of the vapors on the metal surfaces of tubular feed solution heaters which form the right or condensation side of the stages. The open or dispersed flow in either or both of the condensation ladders are replaced by closed condensing tubes on the surfaces of which the vapors condense: as in FIG. 3.

Means for deaerating the feed and exhausting non-condensible gases present or formed are necessary, are conventional, and are not a part of the present invention. Such are not shown in FIG. 1, nor for the condensing zones of 111 of FIG. 2. Such vent lines, 30, for the condensing zones, 11, of FIG. 2, ultimately pass to a vacuum pump.

In the usual case in either FIG. 1 or FIG. 2, there is a minimum of hold-up of the liquid being heated on the condensation side, 11, of the system. However, in some cases it has been found advantageous to provide for a substantial hold-up of the liquid being treated in the half-stage 19, the top stage, one of the top stages, or between such high temperature stages. The continuous flow is thus delayed to give a hold-up time of the liquid being treated at a high temperature. This may afford the time necessary for some chemical or other reaction of the constituents of the feed liquid to take place, e.g., hydrolysis, prior to the addition of reagents or chemicals after completion of preheating. An example is where the reaction at the highest temperature may be the wet combustion or partial wet combustion of an organic material by introducing air and/or pure oxygen into the prime heater reactor 12. Many materials, including carbohydrates such as celluloses and starches and related materials are hydrolyzed by water under heat and pressure. The chemical products of such hydrolysis are often water-soluble and contain much high amounts of oxygen and hydrogen than did the original material which has thus become higher in fixed carbon. The soluble hydrolyzates are much more readily reacted with air or oxygen in the wet combustion accomplished in the prime heater reactor 12 of FIG. 1 which follows this prehydrolysis during the preheating in the half-stage 19 by increasing its volume and hence hold-up or residence time, or similarly in one of the top stages. A simple hold-up vessel outside the sequence of condensing zones of the stages would accomplish the same purpose and would be necessary if closed tubes were used for heating the feed liquor.

This increased residence time may be arranged at almost any desired level of temperature if such is critical; by selecting the stage at or close to the desired temperature and inserting sufficient volumetric capacity in the line there to give the desired hold-up for the reaction at the desired temperature.

SUBMERGED COMBUSTION

So-called "submerged combustion" of gaseous or liquid fuels is yet another type of heat exchange by direct contact of fluid streams, in this case the hot combustion gases and the dilute feed being heated. By burning a liquid or compressed gaseous fuel with compressed air under a liquid surface, the heat of the combustion transfers from the combustion gases directly to the liquid. This has been used to give hot water or hot solution, or to evaporate corrosive or other solutions which corrode heat transfer surfaces.

FIG. 2 diagrams a horizontal vessel fitted with an internal combustion chamber 60 supplied with fluid fuel through line 62, and air through line 63 under pressure supplied by compressors 64 and 65, respectively; also with a supply line 73, and discharge line 76 of sea water; also discharge means, line 31 for combustion gases with more or less steam.

One accessory of this submerged combustion heater is the combustion gas cooler 68. This allows also the elimination of non-condensible gases from the feed sea water. Such gases will be forced out of the sea water as it is heated in the submerged combustion boiler; and these gases will go off with the combustion gases and be cooled and discharged together through an expander 67 for recovering the energy of compression of the gases; thence from the system through line 75.

A part of the cold dilute feed to the system passes downwardly through the counter-current scrubber or combustion gas cooler 68. This chills the products of combustion from the submerged combustion operation to the lowest possible temperature, in order to condense out the maximum of water vapor before discharge. The lowest available cooling medium is the inlet dilute feed down over packing or cascade trays, against the rising gas stream. Desirably, it has a height equivalent to from 4 to 10 equilibrium units in counter-current. A small part of the entering, cold feed condenses the water vapor associated with the mixture of non-condensible gases of the feed liquid and the combustion gases; principally carbon dioxide and nitrogen so that they discharge at a temperature preferably not more than 20° F. above the feed temperature, and saturated with moisture under those conditions. These cooled gases, preferably after an expansion in an expander 75 which recovers the energy required for compression of the air and gaseous fuel (if such is used), may then be passed to any external use, if use there be for this gas mixture.

A greater number of moles of carbon dioxide is produced from most gaseous fuels than the number of moles of the fuel. The nitrogen of the air and any unburned oxygen passes through without change. Hence, there may be recovered most or all of the energy required for compression of fuel gas and air since there is a larger number of moles of gas at the higher pressure to be expanded than the amount of gas at the lower pressure to be compressed (both throughout the same range. This may be done by a system of three cylinders on a common piston rod as indicated in FIG. 2 with the expansion energy of the combustion gases in the expander or right cylinder serving to drive the pistons in the two left cylinders or compressors for compressing the fuel gas and the air for combustion to the higher pressure required for the combustion under the liquid. Alternately, a turbine may be driven by the expanding combustion gases, this turbine being on the drive shaft for two turbine blowers, one for air, and one for fuel gas. In either case, a motor or other prime mover would be connected to the mechanical system for start-up or make-up of energy when required.

When the submerged combustion is of the organic materials present in the dilute solution itself, it is often called a "wet combustion." Such wet combustion will require less, or possibly no, added fuel through the line 62, although air will still be required through line 63. In this case, the balance of energy available from the expansion of the combustion gases will be somewhat greater than that where a gaseous fuel itself must be compressed in compressor 65.

As indicated in FIG. 2, a motor-generator 69 is connected to a crank arm of the piston-rod for 64, 65, and 67. On start-up, 69 acts as a motor to compress the air and the gaseous fuel. During regular operation, 69 operates as an electrical generator to give what may be a substantial amount of power over that required for the compressors. This may be a net gain of power for other use or sale.

The carbon dioxide from the combustion may react with calcium or other salts present in the dilute solution, to give relatively insoluble carbonates which may precipitate. If dilute waste pulping liquors are being processed, either for evaporation or for wet combustion, the stable salts under the particular conditions will usually be the carbonates, and the acetates, plus others depending on the cooking chemicals used.

In some cases, organic and oxidizable materials are present in the dilute solution being processed, such as sewage, sludges therefrom waste liquors from pulp and paper manufacture—rather than the sea water of the usual examples. These waste materials in a macerated or comminuted form may supply ample heat in a "wet combustion" merely by the supply of oxygen or air through line 63. The temperature may first be brought up to 300° to 350° F., either by steam if available, or by usual submerged combustion, with supply of both air and fuel gas— then the reaction becomes sufficiently exothermic to supply heat for the evaporation, and electric power from 69 due to the expansion of the gases in the expander 67. Instead of the indicated piston units 64, 65, and 67, there may be centrifugal units on a common shaft to drive, also on the shaft, the motor-generator.

Submerged combustion may have a major use with the flow sheet of FIG. 1 for flash evaporation—open condensation with chemical reaction between; and the relation of the supply of air, and of recovery of steam and power may be related to the flow sheet of FIG. 2. The flash evaporation, as any evaporation, does concentrate the solution, after the chemical reaction, but the net effect is lost in FIG. 1 because the steam formed goes to dilute further the feed—not a disadvantage in many cases.

If relatively large amounts of steam and gases are produced, particularly when the fuel being combusted is in the dilute solution being fed to the system, the mixture of gases and as much steam as is not needed in the condensing-heating side 11 of the ladder may be withdrawn for use. A cyclone or other type of demister may be necessary to minimize entrainment. This may take the place of the combustion gas cooler 68 in FIG. 2 or attached to the line 131 in FIG. 1.

The term "solution" as used herein includes also those suspension solutions of particulate matter which may be handled or treated like solutions by the methods of this invention; particularly sewage wastes from the many sources, colloidal mixtures—as of peat and water, liquors coming as residues from pulping of ligno-cellulosic material, etc., or other thin pumpable slurries of from 1% to 15% by weight of fibrous material of a ligno-cellulosic or other nature such as sawdust, wood flour, or other plant fibers, or particulate activated matter containing adsorbed material.

CHEMICAL REACTION IN DILUTE LIQUORS

In order to accomplish a chemical reaction in a dilute solution, a substantial amount of heat may be required to heat the dilute solution up to a sufficiently high temperature for the chemical, biochemical, or physical reaction to take place. The reactions may be simply called chemical as an inclusive term. In some cases, e.g., the crystallization of salts from solution, there may be a theoretical question whether this is physical or chemical; but the processes are equally useful, regardless of that question. Once the process has been started, it may, in many cases, continue by itself, often exothermically. The chemical reaction then takes place between the dissolved or suspended materials in the solution, or with one or more added materials—gas, liquid, or solid.

The heat required to bring up to reaction temperature may be a major part of the cost of operation. Particularly is this a large expense if materials of little or no value must be handled on a very large scale, as sewage or sludges from sewage—with or without added solid wastes—containing 75 to 95% or more of water, also peat and other colloidal materials.

Also, constituents in water which form boiler scale, may be removed by precipitation at high temperatures, with or without the addition of small amounts of chemicals. One method is that of U.S. Pat. 3,408,294, which is also a divisional application of the parent application, Ser. No. 252,473, now U.S. Pat. No. 3,329,583. The heat required for heating hard waters to the necessary high temperature would be impossibly expensive for this simple operation of "softening" water, unless the heat could be recovered. This is made practical by the vapor reheat system of cooling by flash-evaporation of the hot liquid after the reaction, and direct heating of the dilute feed liquid passing in open, dispersed flow in condensing zones with open condensation of the vapors formed by the flash evaporations. In the crystallization of boiler scale out of solution, there is usually some heat given to the solution; and this heat lessens correspondingly that which must be supplied from external sources. This heat may be regarded as the chemical heat given up in forming the solid phase.

Another example is the recovery of chemicals from the black liquors from various wood pulping operations: usually containing substantial amounts of sodium, magnesium, calcium, etc., combined with lignin, also as salts: sulfates, sulfites, sulfides, carbonates, bicarbonates, acetates, etc.

Thus, vapors formed in multiple-flash evaporation stages heat directly by counter-current contact the dilute liquor in open, dispersed flow in condensing zones of the stages. Very inexpensive equipment is used. There is no heat transfer surface; and there is no danger of plugging, as with heat interchangers of the normal type. After the dilute liquid has been preheated, it passes to a prime heater and chemical reactor (which may consist of one, two, or more vessels). Chemical materials may be added to accomplish a reaction. One useful reaction is wet combustion, accomplished by added oxygen as such, or as air, possibly with other chemical reactive materials for some other reaction. Particularly at start-up, or if the reaction involved is not sufficiently exothermic, the prime heater-reactor may have added to it additional heat in the form of steam, or from other sources, including submerged combustion of an added fluid fuel. The reaction velocity of the wet combustion is increased several times using pure oxygen instead of air, hence the expensive reactor is very much smaller. Of equal importance, the large amount of nitrogen in air, 4 times that of the oxygen, is not there; and the total pressure which the reactor vessel has to undergo and be designed for at the operating temperature is greatly reduced; in addition, the operating temperature may be lowered to reduce considerably the gas pressure and especially the vapor pressure of water. The volume of carbon dioxide produced in the wet combustion is equal to that of the oxygen added; thus, on that basis, the combustion gas would be one-fifth when oxygen per se is used compared with air, since the nitrogen is not present. However, a large amount of the oxygen added goes to produce water which is formed from the hydrogen atoms in the organic molecules. If air is used, there will be nitrogen in the combustion gases, even though there is no carbon dioxide. Hence, the wet combustion gases (largely carbon dioxide) will usually be only from one-fifth to one-eighth, using oxygen instead of air. However, in some cases, oxygen and air are mixed in amounts controlled to give the desired rate or temperature of a complete or partial oxidation of the organics present.

After the reaction, the hot solution is flash evaporated in a ladder of stages, and the flash vapors are passed to the condensing zones to preheat the dilute feed solution in open and extended counter-current flow, by direct contact and condensation.

In those cases where there are organic oxidizable materials present in the dilute solution being processed, e.g., sewage, sludges therefrom, or waste liquors from pulp and paper manufacture, these oxidizable materials may be combined in the aqueous phase with oxygen added as such, or as air. Usually, it is desirable to macerate or comminute the solids so that they will be in relatively small particles to allow adequate opportunity for the wet combustion. Such a wet combustion destroys the organics which may not be discharged safely as sewage wastes directly into rivers or other bodies of water because of their biological-oxygen-demand (BOD), i.e., the oxygen which will be used by micro-organisms in biological degradation of the organics. Thus, the wet combustion fulfills also much of the chemical-oxygen-demand (COD) as measured by the ability of these organic materials to be oxidized chemically.

Much heat may be developed in this process, depending upon the concentration of the organic materials present and their COD. Another important factor is the nature of the organic materials; since it has been found that some types of organic material are very much more resistant to oxidation than are others. Thus, it may be almost impossible to reduce the COD to zero, even by extended time and at temperatures above 600° F. Different materials are found to be combusted at different temperatures, and even extending a treatment at a given temperature for a long period of time does not further reduce substantially the COD of the remaining material. Thus, different organics which are present in a mixture may be fractionally separated by the partial combustion process by controlling the amount of air and/or pure oxygen added, the temperature, and the residence time. Thus, the "softer" or more easily combusted materials are removed from those which are "harder" or less easily combusted.

As is common in most chemical reactions, an increase of temperature accelerates greatly the speed of the combustion in the presence of oxygen or air supplied from the outside. However, there must be a definite amount of holding time in this prime heater or reactor, varying from one minute to several or more hours, depending on the particular operation involved. Thus, the prime heater-reactor should have substantial volume for the operation from one minute to 200 minutes.

It may be desirable after the heating and reaction in the prime heater-reactor to filter or separate solids, or otherwise to process the liquid before it is passed to the first or highest pressure stage of flash evaporation. Filtration at the relatively high temperatures and pressures is difficult and is usually not necessary, since the flash evaporation does not allow opportunity for fouling by the solids present, which may then be removed after the multiple flash evaporation.

Following the wet combustion and the residence time in the prime heater-reactor to allow completion of the reaction, the liquid is flash evaporated in each of a series of stages, thereby becoming more concentrated as it passes from a top stage of highest pressure to the stage of lowest pressure. Vapors pass to the corresponding condensing zones, wherein the cold feed liquid is preheated.

The type of organic materials in the dilute solution— present as liquid or solid, dissolved or suspended—determines the top temperature for preheating by open condensation of the flash vapors. This is at least 300 to 350° F. but may be 400° F. or even higher. A temperature must be reached where adding oxygen gives an exothermic reaction, and depends on the nature and amount of the combustibles present in the dilute solution processed.

FIGS. 1 and 2 are flow sheets of operating processes combining several of the steps. FIG. 1 shows a half-stage—FIG. 2 does not. The half-stage, as described in the parent case, U.S. Pat. 3,329,583, utilizes vapors from the prime heater-reactor for bringing the dilute solution up to the desired temperature. The liquid stream is preheated to the necessary temperature for wet combustion as it leaves the top stage or the half-stage, as the case may be. Oxygen or air is added in pipe 133 and/or through line 63 directly to the reactor, which is of a sufficient size to allow a residence time of liquid from 1 to 200 minutes.

Usually excess air is added to obtain maximum combustion. However, many organics partially burn or combust and form intermediate compounds in going by stages ultimately to carbon dioxide and water. This allows a possible separation of intermediates and is also a fractionation by partial oxidation. Oxygen supply is regulated to accomplish the desired effect without entire combustion. Regulation of the supply of air or oxygen combusts the "soft" chemical materials, e.g., as present in ligno-cellulosic or other fibrous materials, as dry destructive distillation at much higher temperatures and with very little air present distills out and burns out the volatiles and leaves a char of a very much higher content of fixed carbon. A similar partial wet-combustion with the amount of air or oxygen supplied carefully controlled gives a wet carbonization, i.e., the "harder," less combustible material remaining is almost black in color and high in fixed carbon, thus indicating that a wet carbonization has taken place.

With colloidal solutions of peat, only sufficient combustion to break the colloid may be desired, air flow is regulated accordingly, and most of the peat is later separated as granular solids from water discharging in 132 and containing a higher percentage of fixed carbon than in the original peat. Alternatively, the peat may be completely burned to give its full heating value, with substantial generation of steam.

Heat from the wet combustion where there is sufficient oxygen added as such and/or air raises immediately the temperature of the liquid in the prime heater-reactor to 500–700° F. The total pressure is from 500 to 3000 pounds per square inch, including (a) saturation pressure of the water, (b) partial pressures of organic vapors, (c) components of air, principally oxygen and nitrogen, and (d) products of combustion-carbon dioxide and carbon monoxide. Air is supplied at this high pressure, as is also the liquid; and the design pressures for the pumps (not shown) supplying liquid to the half-stage, if used, and to the prime heater-reactor, must be correspondingly higher than those in the vapor reheat ladder of stages.

The temperature reached in the wet-combustion is, as with usual dry combustion, dependent upon the amount of fuel supply and the amount of the oxygen supply and its concentration; i.e., whether air, air enriched with greater or lesser amounts of oxygen, or pure oxygen, is used. With wet-combustion, there are two additional major controls in preventing an over-reaction or to allow only a partial wet combustion if desired. The first is the presence of water, usually in amounts of from five to twenty times the weight of the combustible material. This concentration might be variable, as, for example, in wet carbonizing a slurry of sawdust, but usually it is not; but even with a fixed amount the very large thermal reservoir of this amount of water is a stabilizing effect because of its high specific heat and its high latent heat in vaporizing if the temperature increases unduly. The second control for this wet combustion is pressure, since, unlike most dry combustions which take place at atmospheric pressures, the pressure here may be varied over a very wide range. This is fixed by the pressure at which oxygen, as such or in air, is supplied. If the pressure in the reactor rises to or above this amount, no more can flow, and the combustion is abated until the pressure is reduced to allow oxygen to enter. This is a very sensitive control since the large reservoir of heat in the water prevents the too rapid rise or fall of temperature, and hence pressure. Additionally, the rate of gas and vapor discharge is controllable; by venting larger amounts more water is vaporized to give steam and the pressure and temperature is reduced.

Thus, not only the rate of the combustion may be controlled, but particularly also the degree or selectivity of partial wet combustion or oxidation of a material or even of a particular molecular structure. This is not possible in dry carbonization of wood, for example; once a mass of wood is heated above a critical temperature, the exothermic reaction goes autogeneously to completion. Here it may be controlled, to give a partial carbonization, and even, to some extent, to give selectively more or less oxygenated compounds from the "softer" materials.

This strongly exothermic wet combustion burns organic materials at a much lower temperature than that of dry combustion in the usual furnace. However, the steam which is generated and available at the correspondingly high pressure is generated in the same zone as the combustion itself, rather than in a removed zone, as in the case of the ordinary boiler tube with a gaseous combustion outside the metal wall. Here again is an example of the direct contact heat exchange between fluids, the realization of which is one of the prime purposes of this invention.

The substantial amount of gases from the combustion may be separated readily from the top of the prime heater-reactor along with some steam. A cyclone may aid this separation. These permanent gases with a considerable amount of steam may pass off to an expander, either turbine or other form of expansion engine, which can utilize best the mixture of steam and the combustion gases, largely carbon dioxide and nitrogen, together with certain volatiles. FIG. 1 shows the liquid being withdrawn through line 113 from the bottom of the prime heater-reactor 12, to a second vessel 212. The liquid so withdrawn will be practically free of non-condensible gases.

The liquid may be allowed to flash evaporate at a slightly lower pressure in this second vesel 212, to give steam directly usable for other process purposes, e.g., for use in an evaporation. This then is supplied, for example, to line 31 of either FIG. 1 or FIG. 2, to heat the half-stage, if such is used; and other streams of steam at this relatively high pressure may be withdrawn through line 231 of FIG. 1 for other uses outside of this system. The hot liquid then may be passed, either directly or after going through a filtering device or other additional chemical treatment as indicated by 112 of FIG. 1, into the top stage of the MSF evaporator-cooler, in the familiar form, the left side 10 of the ladder of FIG. 1, or 110 or FIG. 2. While not shown, a conventional MSF unit with vapors condensing on tubes for preheating the feed may be used as mentioned above. If the vapors from the MSF evaporations have a closed condensation, the condensate may be recovered as distilled water, and the incoming feed liquor is not diluted, and its discharge may be more concentrated correspondingly. The same is true of any other liquid being processed according to this invention.

Organic compounds often combust to intermediate compounds before going finally to carbon dioxide; and these intermediates are more difficult to oxidize further. One of the last of the organic compounds to be oxidized is acetic acid. The acetic acid molecule has as many atoms of oxygen as of carbon, two of each, and oxidizes in this wet combustion only at a temperature above 430° F. Formic acid with two atoms of oxygen to one of carbon is also found with the acetic acid; but it is much less stable.

If it is not necessary or desirable that the acetic acid be combusted completely, aqueous caustic soda, lime water, or other alkali may be injected in FIG. 1 through line 133, or into lines 27 or 113, or to the top stage of the evaporator side 10. Comparable points of possible addition of alkali in FIG. 2 would be by line 233, or into line 44. This alkali will neutralize volatile acids, most of which is acetic acid, which otherwise may cause corrosion. Particularly, it is desirable to prevent volatile acids flash evaporating and condensing into the fresh water product, if such is made in a subsequent vapor reheat ladder, as in FIG. 2.

By injecting an alkali, as caustic soda or lime, into the feed at 114, or into the preheated feed at 127, the wet combustion will produce sodium acetate or similar salts of the homologues of acetic acid as the oxidation of the organic matter proceeds. This salt or salts may be further degraded by oxidation to carbon dioxide and sodium hydroxide or carbonate but at a higher temperature or may remain and pass in FIG. 1 to the flash evaporation side 11 of the vapor reheat ladder, thence out line 132, for separation from the discharge water. Various solids in this discharge may be decanted. A similar route would be followed in FIG. 2.

Similarly, aqueous sulfuric acid or other non-volatile acid may be added at line 113 or 133 of FIG. 1, or line 233 of FIG. 2, to neutralize amines or other volatile alkaline materials which may be present or formed in the reaction. If acetic acid is to be neutralized by alkali addition, this should be done at a point upstream of the addition of sulfuric acid, which should be added only in such amount as determined by the pH of the resulting solution, so that there will be no reaction with the sodium acetate to release acetic acid from its salts.

Particularly useful is this process in handling black liquors from wood pulping for paper production. These liquors contain inorganics which may be reused after the dry combustion, as is standard practice after concentrating black liquors. In this wet combustion of the lignins and other organics present in these black liquors, sodium or other metals or metalloids which are present as salts, react with the carbon dioxide under the high pressure and intense activity, to give salts, which then will be in a form which can be made available for reuse in preparing pulping liquors.

Another example of the use of the method of this invention is in the partial or complete wet combustion of peat. Peat to be used as fuel is usually dried in the open air to remove the 80 to 95% moisture present in the colloidal form of the material. When it is impractical to dry peat—as in northern countries with insufficient sunshine—a slurry in water may be partially wet combusted to break the colloid. Separation is easy of peat particles containing 35–60% moisture, from most of the water discharging in the flow sheet of FIG. 1 from line 132. Complete wet combustion gives the full heating value, and 132 would carry water practically free of organic materials, except acetate salt if produced by addition of alkali as indicated above. Some inorganic salts would be dissolved and there would be the normal ash constituents. In any case, the control of the reaction, and some recovery of heat otherwise rejected, is accomplished by-passing a small stream around the prime heater. This is described in U.S. Pat. 3,329,583. However, as indicated above, peat may be treated for partial burning off or partial wet combustion of the compounds which it contains and which make it colloidal to obtain granular solids as a residue. This partial wet combustion is carried out in the liquid phase under controlled conditions of (a) time of residence, (b) temperature, and (c) partial pressure of oxygen. The conditions employed for liquid phase oxidation with respect to time, temperature, and oxygen partial pressure would not be effective for oxidizing the same organic material in a gas phase. Hence, organics which are most readily wet-combusted must be those which are soluble in water or which hydrolyze under the high pressure and temperature conditions prevailing in the prime heater reactor 12 to give materials which are soluble in water.

In the case of peat, the "soft" or gummy materials compare to what are normally called the "volatiles" in coal; they are much more readily hydrolyzed and oxidized to yield a granular, relatively "harder" residue material which becomes black and resembles coal in appearance and is much more resistant to oxidation. Its fixed carbon precent (dry basis) increases, particularly if the temperature is not allowed to go over about 300° F. to 350° F. by limiting the oxygen supply. The soft material is removed by wet-combustion to yield a residue matrix of carbon having a high activity for adsorption, i.e., extensive internal area available as "sites" for molecules to be held. This carbon is pulverant and of low density when separated and dried after cooling, and it may be used as a water purification carbon.

An activated carbon of improved physical properties may be produced similarly by controlled wet combustion from an aqueous slurry of sawdust or other lignocellulosic granular or fibrous material, generally at temperatures between 320° and 350° F.; in some instances, higher temperatures on the order of 375° F. are required for some dense fibers. Prehydrolysis of the organics prior to wet combustion may be employed as a part of the overall process of degradation of these materials during the carbonization reaction, the latter taking place in the prime heater-reactor 12 by addition of controlled amounts of oxygen as such, and/or air through 127, the addition being made after heating and prior to cooling as described above. Thus, the water at high temperature holds the organic material in suspension in the several heating chambers of the vapor-reheat system while dissolving or hydrolyzing much of the "softer" components. These softer materials, dissolved or hydrolyzed, are more readily wet combusted than the more refractory, i.e., more carbonaceous residue which remains. This is analogous to the carbonization process for producing activated carbon by dry heating, usually in the presence of superheated steam. In the dry heating process, the volatiles are driven off and these include those materials of suitable vapor pressures, as well as those which break down under the conditions employed to give volatile materials which are driven off leaving a residue of much less volatile or refractory materials.

The necessary residence time for carrying out prehydrolysis may be obtained for example by enlarging the liquid capacity of the half-stage 19, or of one or more of the heating chambers of the vapor reheat stages on the condensation side 11, of the unit. Such increase in capacity allows a hold-up time of the continuous flow of the steam; and this hold-up time may be secured at any desired temperature by increasing the capacity of the corresponding heating chamber handling the liquid stream at that temperature.

Either activated carbons so produced, or commercial activated carbons prepared otherwise, may be used in a tertiary sewage-treating process, following the conventional primary settling and secondary biological oxidation. In either case, the activated carbon adsorbs organic and some other materials in reclaiming this effluent sewage water, which then may be potable. Usually chlorination will not be required; and the water is obviously sterile after the high temperature treatment. Adsorbed impurities are burned off from a slurry of the activated carbon by wet combustion at a controlled temperature of about 350° F. This carbon reactivation is yet another example of a process which may be accomplished by this invention which provides for the economical and simple heat interchanging for heating and cooling the liquid; and without the use of heat transfer surfaces. Other particulate activited materials also are so reactivated.

In general, the temperature for production of carbonized organic materials, a pulverant charcoal, an activated carbon, or a revivified activated carbon will be held in a relatively close range between about 300° and 375° F., depending on the product desired and the material used, the concentration of its suspension or solution. (Entirely soluble organic materials may also be partially wet-combusted or partially wet-carbonized to give insoluble carbonaceous products.) The corresponding pressures will be usually between about 200 and 700 p.s.i., depending on the concentration of oxygen used, pure, mixed with different amounts of air, or air itself. To maintain a lower pressure and temperature, heat is removed by evaporating more water, and the vent valve on 131 or 231 is opened to allow more steam to escape. The heat supply must be balanced by the amounts of combustible material and oxygen supplied.

As with most chemical reactions, the velocity here increases very markedly with the temperature; and a shorter residence time is necessary with a higher temperature. The degree of the partial wet combustion or partial wet carbonization is, however, very much a function of temperature and may only proceed to a certain stage both of removal of "soft" materials and of their degradation to oxygenated compounds at some minimum temperature, regardless of time. In general, the time of residence in the prime heater reactor 12 may be from 3 to 90 minutes, while the time for a prehydrolysis, if provided for by increasing the volumetric capacity of the half-stage 19 or the condensing zone of another stage, may be from 2 to 40 minutes.

In chemical reaction processes utilizing vapor reheat with recovery of heat otherwise rejected, impurities are eliminated to purify water. Distilled water also may be recovered, or twice-distilled, as indicated in U.S. Pat. 3,329,583, by a MSF heat exchanging with the feed liquor.

LIQUID-LIQUID CONTACTING FOR HEAT EXCHANGE AND EXTRACTION

The counter-current contacting of a cold liquid (solvent), substantially immiscible, with a hot aqueous stream to remove heat therefrom, is well known in the art. The solvent is heated thereby and, by a second counter-current liquid-liquid contacting, may give up its heat to a second cold aqueous stream.

This liquid-liquid-liquid contacting operation for heat exchange has been called LEX; and the contactor or step handling the colder aqueous phase has been called LEX–1 and the contactor or step handling the warmer aqueous phase has been called LEX–2.

LEX–1 and LEX–2 are used exactly the same as liquid-liquid extractors, and any efficient extracting equipment may be used. The immiscible liquids used for LEX operate as do solvents in an extractor. It has now been found that the same solvent liquid may often be used as both the heat carrier in LEX and as a solvent to extract water from the dilute solution. Less often, the same equipment and operation may accomplish both purposes: (a) transfer of heat and (b) transfer of some of the water from the dilute solution to the solvent, thereby concentrating the dilute solution.

Hydrocarbons are the most available non-aqueous liquids or solvents; and the solubility of water therein has been reported in many technical papers (e.g., Petroleum Refiner, vol. 36, No. 5, p. 256–1957). Thus kerosene dissolves 8 mol percent of water at 350° F., or 100 times as much as the 0.08 mol percent it dissolves at 90° F., or 100 times as much as the 0.08 other dilute solutions of salt and other materials, which are not themselves soluble in the hydrocarbon, is almost without effect on the degree of solubility of the water. Since these materials do not dissolve in the hydrocarbon, the water dissolved is pure when the solvent is separated.

Thus, by contacting hot dilute sea water with kerosene, water is dissolved. This largely separates as a separate layer on cooling, and may be decanted. The amount of kerosene which dissolves in the water of the dilute solution discharged from the extractor also increases with temperature, but as this is always less than about 0.01%, it may usually be neglected.

Also, it is well known that some other solvents have a much greater solubility for water at lower temperatures than at high temperatures. For example, 1 pound of di-n-propyl amine dissolves about 1 pound of water at 32° F. and only about $\frac{1}{13}$ pound of water at 212° F. In other words, if one pound of this solvent was saturated with 1 pound of water at 32° F. and then heated to 212° F., $\frac{12}{13}$, or about 92% of the water which had been dissolved, would separate out of the solution. Other liquids have comparable ratios of solubilities cold to hot in other temperature ranges.

Thus, since the conventional MSF evaporation process and the vapor reheat MSF process for separating fresh water from sea water always operate in a range of temperatures between a highest and lowest, it has been found possible to conduct the extraction of water by a solvent from the dilute solution—possibly in a LEX—at one of these temperatures. The dilute solution is thus concentrated. By changing the temperature of the extract or solvent stream discharged from the LEX, some of the water separated out and removed in the extraction step may then be recovered in a pure form. The usual amount of pure water is then produced in the MSF evaporation, which cools the hot raffinate stream from the extractor. The MSF evaporation may be either conventional or vapor reheat, and may operate between substantially the same two temperature levels as does the extractor.

The increase of the concentration of salt or other inorganic materials of sea water, for example in the raffinate layer leaving the extractor, makes little difference in the solubility for water of the solvent, and this increase may give the advantage of a salting-out effect to reduce the amount of solvent dissolved in the raffinate.

EXTRACTION OF WATER FROM DILUTE LIQUORS, FIGS. 3, 4, 5, 6, 7, 8, 9, 10, 11 AND 12

No solvent is known which will extract salt from water, although various solvents can extract water from sea water to give a more concentrated brine. Distillation steps are usually used to separate the solvent for reuse, from the extract or solvent layer, and from the raffinate or brine layer. These steps may be expensive of heat in this extraction of water.

Alternately, advantage may be taken of the difference of solubility of water in the solvent at two different temperatures. After the extraction at one temperature (high or low, whichever temperature gives most solubility in the particular solvent), the temperature of the extract layer is increased or lowered, as the case may be; and the lesser solubility of the water at that temperature causes it to form a separate layer which may be decanted.

Since, by definition, two immiscible liquids are in contact, the total pressure on the system is the sum of the two vapor pressures. Thus, in operating an extractor at a high temperature, the extractor and all related equipment must be designed for the total of the vapor pressures of water and of the solvent at the particular temperature used.

Solvents which may be used in the practice of this aspect of the invention fall into two categories referred to respecfully as "hot" extracting materials and "cold" extracting materials. Hot extracting materials are those in which water is markedly more soluble at higher temperatures. This permits separation of solvent and dissolved water by cooling and decanting. Cold extracting materials are those in which the water is markedly more soluble at lower temperatures and which thereby permit separation of solvent and dissolved water by heating and decanting at the high temperatures.

The primary requirement of the solvent employed, whether of the "hot" or "cold" extracting type is that its capacity to dissolve water be such as to allow the dissolving and separating of significant quantities of water over a relatively limited temperature range. Other criteria to which the solvent should conform include, for example, the absence of toxicity or tendency to impart a taste to the potable water product; low cost; low solubility in water at the temperatures employed for separating the solvent water components, absence of any tendency to undergo a reaction under the conditions of temperature and pressure employed in the process to yield undesirable substances e.g., acidic materials generated by solvent hydrolysis; accordingly, such solvent material should desirably be chemically inert.

Thus, in general, solvent materials suitable for use herein may be classified as comprising inert, organic solvents in which water is (1) at least substantially soluble over a first temeprature range, and (2) at least substantially less soluble over a second temperature range, said solvent being substantially insoluble in water at said second temperature range.

Examples of solvents included by the foregoing definition are hydrocarbons such as kerosene, toluene, xylene, naphtha fractions and the like; alcoholic solvents and preferably, mono- and polyhydric, saturated, aliphatic alcohols containing from 5 to 8 carbon atoms, e.g., n-butanol i.e., n-butyl alcohol, isobutanol, amyl alcohol and the like; ethers including glycol mono- and diethers such as the Cellosolves, Carbitols (glycol diethers) and the like; ketones containing from 3 to 15 carbon atoms e.g., methyl ethyl ketone, diethyl ketone and the like; certain diamines and triamines containing from 6 to 12 carbon atoms e.g., triethylamine and the like.

Within the classes of solvent materials enumerated, it will be understood that certain ones will be capable of providing greater advantage in a given instance having reference to the aforementioned criteria and particularly, with respect to ease of separation of water from solvent and solvent from water as well as range of temperatures necessary to achieve the respective conditions of substantial water solubility and water insolubility in the solvent selected.

Thus, with respect to kerosene, it is found that rather high operating temperatures are necessary (e.g., 650° F.). This in turn imposes high pressure conditions on the order of 2,500 p.s.i.; and, of course, requires rather expensive equipment. Moreover, at the high temperatures involved, the corrosive action of sea water on stainless steel, for example, must be taken into consideration. On the other hand, hydrocarbon solvents, such as typified by kerosene, are advantageous in that they are relatively inexpensive and exhibit very low solubility in water and vice versa and particularly at the low temperatures employed for solvent-water separation. The latter property is particularly significant since it obviates any necessity for resorting to cumbersome and expensive operations for purposes of obtaining the solvent and/or water in substantially pure form such as stripping by distillation. It would be necessary, of course, to employ a sulfur-free kerosene in order to avoid any possibility of imparting an odor or flavor to the water product. However, kerosene and related hydrocarbons even though present in trace quantities in the water product, would not present a serious problem since they would be bland to the taste. In any event, a simple treatment of the water product with carbon, e.g., activated carbon, would suffice to eliminate even the slightest possibility of taste "contamination" of the water. By way of contrast, the chlorinated hydrocarbons would not be suitable for use as solvent materials since they have an extremely low miscibility with water and exhibit a pronounced tendency to hydrolyze under continued use whereby to yield hydrochloric acid. Thus, solvents of this type would not be chemically "inert" as explained above.

Use of "hot" extracting hydrocarbon solvents such as represented by kerosene in the practice of the present invention is illustrated by reference to FIG. 3 which diagrams the extraction of water at the highest temperature of a conventional MSF system.

Here, the inventive method accomplishes the process, an extraction, on a previously preheated dilute aqueous solution, and then uses an MSF evaporation to cool the hot solution (now more concentrated), while supplying vapors to preheat the original dilute solution.

The high temperature of the sea water going to the extraction may be developed in the half-stage 19, as previously described. This is supplied with steam by line 333, to heat the sea water to a temperature higher than that of the top stage, or in the prime heater 12, supplied with steam 33, to heat the recycling solvent, kerosene. In this particular case, the use of the prime heater 12, has three advantages (a) it heats only kerosene, thus there is no danger of scale formation in the prime heater, and any precipitation of scale-forming materials will be in the hot aqueous layer in the extractor 50; also (b) the highest temperature of the kerosene, where it dissolves most water, is at the discharge of the concentrated brine as raffinate layer as this layer passes to the top stage of pressure P' of the MFS side 10, of the evaporator; and (c) heating of the kerosene in the prime heater 12 may be done by direct contact, e.g., by bubbling steam up through liquid kerosene or by spraying kerosene into a steam-filled vessel. The condensate-water of the prime heater 12 may be decanted and passed to join the other kerosene-saturated water going to the condensate side of the MSF. This is not shown in FIG. 3.

Concentrated brine discharges through line 32 from the lowest stages of the MSF system which may have any desired number of stages, usually many more than the four shown in this illustration.

The brine is preheated in the condensation side 11, then passes to the extractor 50, where, sub-divided into droplets, it contacts and is extracted and loses some part of its water content as it settles downwardly.

The extract or kerosene layer leaving the top of the extractor 50, is cooled to separate water. First, it passes through the heat exchanger 118; with the same kerosene returning to recycle as solvent to the extractor 50. Then it may be cooled further, if necessary, in the cooler 25, supplied with cooling water (e.g., raw sea water, which is returned to the sea). This cooler may be regarded as a method of rejecting heat comparable to the other methods described in co-pending application No. 639,989, now U.S. Pat. 3,445,712.

The kerosene is separated in the decanter 51, from the water which comes out of solution on cooling. The kerosene layer returns via the heat exchanger 118 and the prime heater 12 (if used) to the extractor. The cooled water layer is passed back to the condensing side 11, of the MSF evaporator to a stage at approximately the same temperature.

The very small residual solubility of kerosene in this water from the decanter 51, collects with the water-condensate in the right side of the MSF evaporator, along with that from the raffinate layer from the extractor 50, which will have steam distilled over with the flash vapors in the upper stages. This may pass down through lines 16 with the condensate water out of the system and will be decanted off in the storage tanks for the fresh water. The solubility is extremely low in the water, and if a kerosene is used which has been treated to remove impurities which cause an objectionable flavor, nothing more must be done. In exceptional cases, a small amount of activated carbon will remove all lingering tastes or aromas from the product water.

Whereas in FIG. 3, the heat exchanger 118 is indicated as being of the standard, metal-surface type, any other type may also be used. In the case where aqueous solutions and a solvent (here kerosene) for the water is used, the LEX is not applicable, since the water going in the one LEX of the pair dissolved in the hot kerosene would come back in the hot stream of kerosene from the other. Thus, while the heat transfer would be excellent, the extraction would be negated.

Other systems of heat transfer using an intermediate carrier for the heat may be used here to advantage. One is to use particles or other masses of solids with large surface area which may be readily contacted with the fluids. The heat of the hot fluid stream is absorbed in the solid mass by direct contact therewith, and then is regained by heating the cold stream which is alternately contacted with solids.

Such interchangers are well known, particularly for gas heat interchange. The thermal wheel and similar devices have solid masses of large surface area in a rotating circular drum, which is heated by flowing of a hot fluid parallel to the axis of the drum, through a sector. The cold fluid flows counter-currently through another sector. As the drum revolves, the volume of material of large surface area moves past the fixed sectors of the two flows, and heat interchanging results.

Still another system uses fluidized solids in two beds, with connecting accessory fluid lifts and rundowns for the particles. In one bed, the particles are being heated by the hot fluid, and when they are mechanically transferred to the other bed, they give up this heat to the cold fluid.

Such devices are well known to the art, are not, by themselves, a part of this invention, but may desirably be used in some cases to gain full advantage of the systems described in this and other figures.

FIG. 4 is another example of the use of extraction as a process between the steps of heating and cooling the solution, wherein vapor reheat is used with an LEX system comprising a pair of vessels 40 and 41 and interconnections, an extractor 50 operating at the high temperature, and ancillary equipment.

Here again, kerosene may be an example of a solvent with a greater solubility for water hot than cold. It is thus used in the high temperature extracting cycle, including the heat exchangers 18 and 25 and the decanter 51. Kerosene also may be used as the heat carrier in the LEX system, and it operates in this in a parallel circuit. As always, the pressures maintained everywhere on the several parts of the system (except the MSF evaporator) must be at least equal to the sum of the vapor pressures of the aqueous solution and the particular kerosene used at the particular temperature.

Here again, the prime heater 12 might take in the necessary outside heat as steam through line 33 to the kerosene side of the system, with some of the advantages noted under FIG. 3; or through the half-stage 19, and via line 333. As in other figures, the half-stage 19 so used is effectively the prime heater.

Alternatively, since only a very minor amount of kerosene is present in the stream of fresh water condensate 29 leaving the right side 11 of the vapor reheat evaporator, a combustion of this alone or in conjunction with a well balanced submerged combustion of added fluid fuel in the condensate stream as above described will remove this dissolved impurity.

The extractor 50 operates with the hot solvent cycled back from the heat exchanger 18 and the prime heater 12 (if used) very much as in FIG. 3. However, in FIG. 4, the dilute solution, e.g., sea water, is preheated by the LEX system 40 and 41 utilizing the same kerosene preferably, and the sea water passes directly from the LEX 40 to the extractor 50. The cold water from the decanter 51 may be added directly to the recycling stream 17 of condensate back to the lowest stage; or, if it is warmer than stream 17, it may, as in FIG. 3, pass to the condensing zone of the stage of temperature most nearly the same.

The hot kerosene leaving the top of the LEX 41 is saturated with water at this high temperature, approaching that of the condensate leaving the top stage or the half-stage. It may cycle through the LEX 40 heating the cold feed, but since it is cooled down in preheating the feed, it may suffer a loss of water to the feed stream 14.

Alternatively, this hot kerosene leaving the LEX 41 may pass by the dotted line from its discharge from the LEX 41 to join the hot kerosene saturated with water from the top of the extractor 50 and by being cooled and decanted in that stream lose its water from the bottom of the decanter 51. An equivalent amount of kerosene is then separated after the prime heater 12 from the stream to the extractor and by way of the dotted line, passes back to line it had left—on way to the LEX 40. In this case the LEX 40, by receiving dry kerosene as the solvent, cannot lose water to the feed.

FIG. 5 is merely a modification of FIG. 4, with the same considerations and similar advantages. While FIG. 4 shows the stream of kerosene cycling through the extractor 50 to cycle independently of the LEX cycle (save for the slight alternative modification of the last paragraph and therefore in parallel flow of kerosene through the two cycles) FIG. 5 has the kerosene flow in series through the extractor 50 and the LEX 40 and 41 cycles. Again, the hot kerosene from the LEX 41 may be cooled to remove its water by passing through the dotted line instead of the direct solid line between the top of the LEX 41 and the bottom of the LEX 40.

In FIG. 4, it is possible to use two separate liquids as (a) heat carrier, and (b) solvent for water, if the connections represented by the dotted lines are not used, or if there is an independent system of units comparable to the heat exchanger 18, the cooler 25, the decanter 51 and thep rime heater 12 (or comparably the prime heat is the water immiscible liquid used as the heat transfer agent. However, this is not necessary, since it is possible to use for both duties a naphtha or kerosene fraction which can be found suitable for both functions. Some simplicity of operation may be secured by using a single liquid, in series, with the cold solvent from the LEX 40 being preheated in the heat exchanger 18, then heated in the prime heater, 12 (or comparably the prime heat is supplied in a half-stage), then passed through the extractor, 50, cooled in the heat exchanger 18 and the cooler 25; and the water decanted off in the decanter 51.

Factors to be considered in assessing the suitability of a "hot" extracting solvent for use in the practice of the present invention can be explained with reference to a n-butanol.

This solvent material is particularly preferred for use herein being advantageous from the standpoint of cost as well as solubility relationship with water. Thus, FIG. 9 represents a phase diagram for a water/n-butyl alcohol system with temperature being represented as the ordinate, and relative weight percent of solvent and water in the mixture being represented as the abscissa. In the figure, the solubility curve represents the locus of coordinates demarking the one phase or complete solubility condition and the two phase or mutual insolubility, i.e., immiscibility condition. The right hand portion of the solubility curve represents the solubility of the solvent in water over the temperature range indicated while the left hand side represents the solubility of water in the solvent, n-butanol. As will be noted, at 120° C. (line L-1) there is 47% water dissolved in 53% butanol; however, at 30° C., (line L-2), there is but 20% water dissolved in 80% butanol. Clearly then, by cooling a butanol solution saturated with water at 120° C. to temperatures on the order of, for example, 30° C., water substantially free of salt but containing about 6% butanol would be separated out as a distinct phase, i.e., an amount of water corresponding to the excess over the solubility limit in n-butanol at the low temperature.

The solvent phase contains approximately 20% water which is unavoidable since the water is present as a soluble component at the low temperature. Ideally, the solvent should allow complete separation by decantation of solvent and water at the lowest temperature employed in the process which would approximate the temperature of the feed brine solution. A phase diagram of such a system would depict the "leg" portions of the solubility curve as contacting or closely approaching, e.g., asymptotically, the ordinates of 0 and 100% water. It is realized, of course, that the "carried" water tends to decrease the overall efficiency of the solvent; however, effective implementation of the process herein described does not necessarily require complete recovery of solvent free of water although it is envisaged that, circumstances permitting, auxiliary processing such as solvent stripping may be availed upon to insure recovery of solvent-free water. In fact, in certain of its embodiments, the present invention provides for such a contingency.

The foregoing notwithstanding, the primary consideration is that the weight ratio of (a) the water dissolved in solvent at the high temperature to (b) the amount of water dissolved in solvent at the low temperature be sufficiently high to permit removal of substantial quantities of water during each cycle of the process.

The significance of the foregoing can be illustrated as follows: at 120° C., a solution containing 52.5% of butanol and 47.5% water is obtained while at 30° C., the solution contains 80% butanol and 20% water. Accordingly, one pound of butanol dissolves 0.9 pound of water at 120° C., while at a temperature of 30° C., the same one pound of butanol is capable of dissolving only 0.25 pound of water. Thus, the amount of fresh water extracted and separated by cycling one pound of butanol within this particular temperature range would be 0.65 pound. The amount may actually be slightly higher due to the "salting out" tendency of the salt present in the sea water. On the other hand, however, since the water separated carries a minor quantity of butanol as a dissolved component, there is correspondingly slightly less than one pound of butanol present as the solvent phase.

The recycle solvent under normal processing, contains an amount of dissolved water the exact amount depending upon the temperature employed for decantation. Accordingly, a certain amount of heat is wasted in reheating this water. However, the utilization of efficient modes of heat exchange correspondingly reduces the economic significance of heat losses attributed to the re-heating and cooling of the excess water carried by the solvent to recycle.

With reference to the right hand portion of the phase diagram representing the solubility of solvent in water, it will be noted that the water layer at 120° carries 15% butanol as a dissolved component, while at 30° C., the amount of dissolved butanol approximates 6%. As indicated above, the actual figures might perhaps be slightly smaller due to "salting out" effects as well as the fact that the butanol separated out contains a minor quantity of dissolved water. On a weight basis then, for each one pound of brine leaving the extractor 50 (FIG. 3) at 120° C., there is dissolved therein 0.176 pound of butanol due to the solubility of the butanol in the water component of the exit brine stream. Consequently, if the brine solution were recycled to the MSF, the butanol component would have to be distilled in the MSF evaporation (conventional or CFE) and thereafter recovered on the condensing-heating side of the MSF stages. Despite the one advantage that the heat evolved from the condensing butanol is available for useful purposes i.e., for preheating the sea water passing through the condenser side of the evaporator, such condensation does not give rise to the desired fresh water but rather, a water-butanol mixture which has to be separated and recovered for re-use. This is required in view of the value of the butanol as well as the fact that its presence in the fresh water product would be undesirable since it is capable of imparting a flavor and/or odor to the fresh water. In addition, the cold water product obtained from the decanter following the low temperature separation likewise requires distillation to remove the dissolved butanol component. The foregoing situation can be avoided by recovering the butanol dissolved in the product water by standard distillation techniques, e.g., of the exit brine stream or alternatively the recovery may be incorporated in the MSF.

The foregoing correspondingly demonstrates the advantage of using solvent materials which exhibit negligible, if any, solubility in water at the temperatures employed for separation by decanting. With reference to FIG. 7, an ideal solvent in this respect is represented by the right hand "leg" of hte solubility curve either contacting or closely approaching the 100% water ordinate at temperatures approximating those prevailing in the decanter. Solvents so characterized as a practical matter, tend to obviate any necessity for the use of solvent separation and recovery operations apart from those inherent in the processing. The primary disadvantage presented by virtue of the necessity of ancillary solvent recovery operations, such as distillation, is largely economic in nature and, in effect, corresponds to the heating costs incurred in reheating the water layer obtained from the cold decanter. This can be allayed somewhat by the use of heat exchange, i.e., recovering the heat from process streams.

Practice of the present invention with respect to butanol can be explained by reference to FIG. 3. The solvent cycle involves passage of the solvent through the prime heater 12 wherein the solvent reaches maximum temperature. Thereafter the solvent passes through the liquid-liquid heat exchanger/extractor, i.e., LEX–EX 50, through the heat exchanger 118 for cooling. The solvent then passes through the final cooler 25 which may be regarded as the heat reject of the system then to the decanter 51 being withdrawn therefrom for recycle through the heat exchanger 118 to the prime heater 12. As previously explained, a certain portion of water is carried along with the solvent as a soluble component namely, that quantity corresponding to the solubility limit of the water in the solvent at the low temperature prevailing in the decanter 51.

The low temperature water layer withdrawn from the bottom of the decanter 51 likewise carries a portion of solvent as a dissolved component which is carried along with the water to the flash evaporator 10. The water from the decanter is introduced into a condensing zone of the MSF wherein the condensing temperature approximates that of the decanted water. The condensate in the MSF passes serially through condensing zones of progressively decreasing temperatures. Since the solubility of the solvent in the water condensate diminishes with decreasing temperature, recovery of additional solvent may be feasibly effected by providing for further decanting of the condensate within the MSF system. Alternatively, the solvent component of the condensate can be recovered by the use of a small stripping column as is standard practice in conventional solvent handling and recovery systems. The necessary heat for distillation can be supplied by the heat exchanger 118.

The concentrated brine solution withdrawn from the bottom of the LEX–EX 50 likewise carries a significant amount of solvent as previously explained. The latter may be suitably recovered, for example, by the use of a small stripping distillation column (not shown) as discussed hereinbefore, whereby to supply only solvent-free brine to the MSF. Alternatively, the MSF system may be initially designed to accomplish the necessary stripping for solvent recovery.

As will be noted by reference to FIG. 3, the heat energy supplied to the incoming brine stream represented at 14 is that necessary to raise its temperatures to approximately the highest temperature encountered throughout the process which would be that prevailing in the prime heater 12. A portion of the necessary heat is supplied by condensing vapors in the condensing zones of the MSF maximum temperature being thereafter achieved in the prime heater 12. On the other hand, the solvent stream undergoes a temperature variation corresponding to the temperature drop across the prime heater 12 and the LEX–EX 50 only. This of course, is in the interest of heat economy since otherwise, in the event that the solvent were cooled to a lower temperature, reheating with live steam, for example, would be necessary while the costs involved might well prove prohibitive.

Similar considerations apply to the systems illustrated in FIGS. 4 and 5. Thus, the benefits to be derived from the extraction treatment in terms of the amount of water rendered recoverable thereby depend primarily upon the nature of the solvent employed, and more specifically they depend upon the logarithmic rate of increase of water solubility in the particular solvent with increasing temperatures. Thus, certain classes of solvents, by comparison, exhibit more drastic or pronounced changes in solubility for water over relatively smaller temperature differentials. Thus, in such instances, operation of the process can be advantageously effected over less drastic temperature differentials to provide separation and recovery of quantities of water consonant with commercially feasible practice. Other classes of solvents, however, require operation of the process over relatively wide temperature ranges in order to render the extraction worthwhile from an economic standpoint. This can be made clear by reference to FIG. 7. Thus, at a temperature of 120° C., there is dissolved in each pound of butanol, 0.9 pound of water while at a temperature of about 110° C., there is dissolved in each pound of butanol 0.6 pound of water. Thus, where the temperature of the extraction and decanting operations, are 120° C. and 110° C. respectively, the extraction step alone is capable of yielding 0.3 pound of water i.e., without evaporation and its substantial heat costs. This is without considering the conventional practice of recycling the brine leaving the flash stages at 32 back into the stream of sea water feed. As will be manifestly clear, conducting the evaporation process over a temperature range corresponding to greater rates of solubility change tends to optimize the efficiency of the extraction and thus the entire process.

Again referring to the system illustrated in FIGS. 4 and 5, other alternative embodiments include, for example, solvent stripping the brine layer withdrawn from the LEX–EX 50 and thereafter directing this brine to the vapor reheat, condensing-heating zones of the MSF to recover its heat content. Alternatively, it may be feasible to strip the fresh water layer to recover solvent, the necessary heat being supplied by suitable heat exchange, this operation being accomplished prior to directing such fresh water layer to the MSF for heat recovery.

Thus, the total quantities of fresh water present in the combined streams from the LEX 41 and the decanter 51 may be stripped of solvent before passing (by lines 17 and 27) to recycle and fresh water discharge (line 26).

As a further modification of the aforedescribed embodiments, solvent recovery may be effected solely with respect to the product water discharging from line 26 thereby allowing the solvent dissolved in the stream in line 17 to cycle through the vapor reheat system, in open flow fashion through the various loci indicated by line 36. The major quantity of the solvent present in the brine solution withdrawn from LEX–EX 50 is volatilized in the top-most stages of the MSF; in any event, substantially complete volatilization of solvent from the brine solution passing serially through the various stages of the MSF occurs prior to discharge of such brine solution to waste 32 thus eliminating any necessity for stripping solvent from stream 32. Thus, as the fresh water condensate including dissolved solvent enters the vapor reheat at 27 at lower temperature, and progressively increases in temperature as it ascends the vapor reheat system, the volatilized solvent component from the aforementioned brine solution is picked up by and thus dissolved in said fresh water since the miscibility of solvent and water increases progressively with increasing temperature.

The presence of solvent in the fresh water condensate entering the vapor reheat ladder at 27 is of no particular consequence in view of the fact that the vapor reheat ladder functions primarily as a system of cycling a cooling stream. About the only disadvantage entailed, which would in any event be of minimal significance, is that the rate of condensation of steam and thus, the vapors evolved in the various evaporation zones, on solvent droplets might be somewhat lower than the rate of condensation of such vapors on water droplets. However, any disadvantage involved would not be of such importance as to justify resort to additional solvent recovery operations whereby to render the fresh water condensate entering at 27 completely solvent-free. It will be further understood, of course, that any solvent present as a separate layer, i.e., in excess of that dissolved in the water leaving the vapor reheat ladder by line 29, may be readily recovered by decantation prior to entering the top of the LEX 41 and thereafter admitted to the solvent cycle.

As indicated by the foregoing discussion, each of the apparatus arrangements illustrated in FIGS. 4 and 5 is beneficially adapted for use in embodiments wherein solvent recovery is effected solely with respect to the fresh water discharged in line 26.

The process of the present invention with respect to the use of a "hot" extracting solvent such as butanol can likewise be illustrated by reference to FIG. 8. The entering sea water is thoroughly mixed with solvent butanol in the mixer M, to produce a mixture 14 which is thereafter pumped through the heating-condensing tubes 14a of an MSF, where the mixture becomes pre-heated. The mixture is then passed through the half-stage 19 wherein the mixture is raised to its highest temperature, which for purposes of illustration with respect to butanol is approximately 120° C. The mixture is decanted in the hot (top) decanter 51 to provide two layers comprising respectively a more concentrated aqueous layer and a solvent layer saturated with fresh water. Each of the layers is passed separately through two sets of flashing stages connected in parallel, the volatilized vapors from each of the layers being supplied to common condensing tubes. As will be recognized, this is the same as in conventional MSF apparatus, one set of flashing stages flashes the brine solution while the other set flashes the condensate water. Both butanol and water vapors are condensed on the condensing tubes 14a to provide a mixture of the two as condensate which, in combination with water from the hot decanter 51, pass serially through the various stages of the MSF and out as shown. The brine solution, from which all butanol has been flashed off, is discharged to waste from the bottom of the MSF at 32. If desired, a part of the brine discharge may be recycled as hereinbefore explained. As is apparent from FIG. 8, the butanol-fresh water layer withdrawn from the hot decanter 51 passes into the condensation zones of the MSF. Thus, each of the butanol and fresh water components will undergo evaporation on cooling, thereby yielding condensible vapors. Accordingly, fresh water and butanol (after cooling in any heat rejection stage or stages), may be recovered by cold decantation in the bottom decanter 51 at the lowest temperature of the process. The product water may be recovered after stripping a butanol in the manner heerinbefore explained. This becomes necessary since, as explained in connection with the discussion of the phase diagram illustarted in FIG. 7, the water phase at the low temperature involved, can contain, for example, approximately 6 to 7% dissolved butanol. Solvent recovery thus becomes advisable in order to avoid any possibility of imparting a taste to the water product, not to mention the economics involved due to solvent cost.

The butanol layer obtained in the cold decanter 51 is likewise saturated with water. Again, as indicated in FIG. 7, the low temperature butanol can contain on the order of 20% by weight dissolved water. This layer is mixed with recycled brine if applicable and the sea water, which may have been warmed in heat rejection stages as shown. The heated mixture is thereafter passed through the condensing-heating tubes of the various stages of the MSF. As the temperature of the butanol increases, there is dissolved therein correspondingly more water; in this manner, the cyclic process is repeated.

Thus, where 1 pound of butanol enters the evaporator system in the condenser tubes 14a of the bottom stage, and is saturated with water, the solution contains 20% by weight dissolved water; otherwise stated, the 1 pound of butanol carries along 0.25 pound of water. With increased temperature, this solution is capable of dissolving more water from the sea water; and at a temperature of 120° C., there is present 47.5% by weight water and this 1 pound of butanol contains 0.9 pound of water as it enters the hot decanter 51. Thus, the total amount of recoverable water per pound of butanol made available by virtue of the temperature-solubility relationship, is 0.65 pound. Moreover, the latter amount of water is recoverable relatively free of heat cost since the heat necessary to effect the required elevation in solution temperature derives from the condensing vapors in the MSF. As will be further recognized, the amount of recoverable water is independent of the total sea water feed except, of course, that sufficient sea water must be introduced to provide that amount necessary to saturate the butanol having reference to the maximum temperature of the system. The decanted layer comprising butanol and contained dissolved water is flash cooled in the MSF. The thermal efficiency of the process in terms of heat requirements can be explained as follows. In general, depending upon the terminal temperature differentials of the MSF (considered overall as a heat exchanger), the heat recovery is approximately 85% of the specific heat of the involved streams between 30° C. and 120° C. Thus, assuming a weight ratio of incoming or feed brine (i.e., to the top flasher stage) to discharge brine of about 10:1, due to normal recycle, it may be further assumed that 1 lb. of water (as brine) is withdrawn from the hot decanter 51 for each 0.1 lb. of brine subjected to flash evaporation. Thus, and with reference to the respective brine and butanol layers withdrawn from the hot decanter 51 (assuming 1 lb. of each layer), the 1 lb. of hot brine solution contains about 15% by weight of butanol dissolved therein at a temperature of 120° C. This would amount to 0.176 lb. of butanol per pound of hot brine solution. Actually, the amount is slightly less due to salting out effects. Accordingly, the total amount of heat necessarily abstracted from the MSF, considering the latter as a heat exchanger, corresponds to that quantity necessary to heat the solution entering the vapor reheat ladder at 27 through a temperature differential of 90 centigrade degrees, i.e., from 30° C. to 120° C. The latter heating requirements in addition to that required for normal MSF evaporation, are chargeable to the extraction part of the operation. Thus, the total amount of heat required can be calculated as follows:

(a) One pound of butanol, plus (b) the total of 0.90 pound of water separated therefrom in the hot decanter 51, plus (c) the 0.176 pound of butanol dissolved in the one pound of brine separated in the hot decanter 51.

Thus the total energy required for heating the above components through the 90 centigrade degree (162 Fahrenheit degree) temperature differential is 253 B.t.u. (the specific heat of water and butanol being 1 and 0.564 respectively). Accordingly, if the efficiency of the MSF as a heat exchanger approximates 85%, the 15% loss is equivalent to 38 B.t.u. per 0.65 pound of water produced by solvent extraction, i.e., in addition to the 0.1 pound assumed to be produced normally by the MSF. Other factors which may also be germane to the aforedescribed determination, but which would, nevertheless, be insignificant in the aggregate due to batancing, cancelling out and the like, include heat requirements associated with the stripping of solvent from the water product, the heats of solution of water in butanol and vice versa, the small amount of additional water produced in the MSF from the MSM cooling of the water in the butanol layer from the hot decanter 51 and the like. However, where the normal MSF has a gain ratio of about 10, or about 100 B.t.u. per pound of water, the heat cost for the 0.1 pound produced by MSF is 10 B.t.u. while that for the 0.65 pound of water produced by the solvent extraction process is 38 B.t.u. as indicated previously. Thus, 48 B.t.u. represents the total heat cost of 0.1+.65=0.75 pound of water which calculates out to a value of 64 B.t.u. per pound of water by the overall process and thus, a gain ratio of about 15.8 in MSF plus extraction, mixing and decanting equipment (given an assumed gain ratio of 10 in the MSF alone). In addition, the aforedescribed calculations assume a much lower temperature for the cold decanter 51, than is necessary, because of the shape of the solubility curve illustrated in FIG. 7. Thus, since the leg portion of the solubility curve appearing in FIG. 7 is substantially vertical up to and in excess of a temperature of about 50° C., the use of extremely low temperatures is not accompanied by commensurate advantage as regards water recovery, at least to an extent having practical significance.

Thus, as the foregoing discussion makes clear, the combination of MSF with solvent extraction enables the highly efficient recovery of product water from a feed brine stream while tending to minimize extrinsic heat requirements.

Other solvents which may be employed to similar advantage in the manner described include for example, toluene, xylene, naphtha fractions and the like. Thus, the aforedescribed materials may be employed singly or in combination, a particularly effective mode of proceeding being the combination of one or more thereof with the butanol to improve the separation of water.

USE OF "COLD" EXTRACTING SOLVENTS

The solvents employed in this aspect of the invention and used as both the heat carrier in a LEX system and as solvent in an extractor system are those in which water is more soluble cold than hot. Otherwise, such solvent materials should conform with the criteria hereinbefore described in connection with the "hot" extracting solvents as regards such desiderata as chemical inertness under the temperature conditions employed in the processing, absence of toxicity or tendency to impart a taste to the potable water product, low cost, low solubility in water and particularly at the temperatures employed for actual separation. Specific examples of solvents suitable for such use include, triethylamine.

The characteristics of "cold" extracting solvents can be explained by reference to FIG. 9 which illustrates the solubility diagram of a triethlamine-water system over the range of temperatures indicated. Thus, at temperatures below about 20° C., there is complete solubility of the triethylamine and water and thus a single phase. However, very slight increases in temperature above about 20° C. lead to substantially diminished solubility of water in the triethylamine. Thus, at a temperature of about 25° C., the water is soluble in the solvent-water mixture to the extent of only about 10%. With further increase in temperature, the solubility limit of the water decreases appreciably and the mixture approaches, asymptotically, a pure solvent condition. The same situation obtains with respect to the right hand portion of the phase diagram which represents the solubility of the solvent in the water phase.

The "cold" extracting aspect of the present invention can be explained by reference to FIG. 6 which represents another modification of the inventive process wherein the dilute solution, e.g., sea water, is heated, processed, and cooled, with the heat of the liquid, after the processing, being supplied to preheat the dilute feed liquid.

Here, the heating and cooling are with the vapor reheat evaporator and the processing comprises the simultaneous extraction and heat transfer in the liquid-liquid contractor, 50, (This is the converse of the extraction-heat transfer operation, 50, of FIG. 3.)

Thus, the cold liquid solvent which has extracted the maximum water from the dilute feed, is preheated in a metallic surface heat exchanger, 18, (or alternates suggested under FIG. 3) by the hot condensate from the vapor reheat MSF evaporator. This minimizes its solubility for water, which separates and is decanted in the decanter 51. Solvents of this type usually have an appreciable solubility in water; and thus the water layer must be stripped in the distillation column, 42, by live steam supplied, 333, at the base. Desirably, all accessories are under at least the same pressure as the sum of the vapor pressures of water and solvent at the highest temperature encountered. The vapors from the stripping column, 42, carry over the steam distillation of the solvent, they are condensed, 43, but not cooled below the condensation temperature; and the hot condensate is decanted in the same decanter, 51. The hot water bottoms of 42 are passed through the heat exchanger, 18, to give up their heat in heating the extract layer from the extractor 50, then passed through line 17, part to discharge as product, 16, and most by 27 back to the lowest stage of the vapor reheat system.

The hot solvent layer from the decanter 51 passes to the prime heater, 12, which as in other cases, may be heated by open or closed steam, 33. In this system, it has been sometimes found more advantageous to place the prime heater, 12, before the decanter and after the preheating of the stream of solvent in the heat exchanger 18. This gives a somewhat higher temperature and slightly better separation of the water from solution in the extract layer; but it increases the temperature in the decanter 51, also the pressure and the temperature in the stripping column 42, and the condenser 43. A balance of the several factors determines whether to place the prime heater 12 as indicated or before the decanter 51.

The hot brine passing from the extractor, 50, to the top flash evaporation stage, with pressure P', will be saturated with solvent which will steam-distill across to the condensation side, where it is condensed with the steam of cooler condensate in open flow. The mixture of solvent and colder condensate passes through the line 29 to the top of the stripping column 42 for solvent recovery. If the particular solvent is substantially soluble in water—and thus there is a substantial amount in the raffinate layer coming from the extractor 50—there may be two layers in the line 29, and this stream in the line 29 is advantageously passed to the decanter 51, for separation of the two liquids and processed with the stream of two phases of the extract layer after being heated in the heat exchanger 18. The solvent layer is recycled to the extractor and the water layer goes to the column still 42.

The process illustrated in FIG. 6 provides, of course, for the recovery of solvent from product water and this is applicable in those instances wherein the solvent employed exhibits appreciable solubility in water at the high temperatures employed for decantation separation. By way of contrast, the embodiments illustrated in FIGS. 10 and 11 are simplified arrangements of apparatus which may be utilized in those instances wherein the solvent is substantially completely insoluble in water at the decantation temperature, and/or may be readily separated therefrom by flash evaporation under the conditions employed in the process. Thus, solvents which are volatile under the conditions prevailing in the evaporator 10 are suitable for use in the processing illustrated in FIGS. 10 and 11. With reference to FIG. 6, the cold liquid solvent which has extracted the maximum water from the dilute feed in the extractor 50 is preheated in the open condensation zones of the evaporator 10 by the hot condensate from the vapor reheat MSF evaporator. Further heat is supplied to the stream by the prime heater 12 thereby to raise the temperature of the stream to a value permitting separation of solvent and water by hot decantation in the hot decanter 51. Heating in the prime heater 12 may be by means of steam. The water phase which separates in the hot decanter 51, is withdrawn and directed through separate open condensation zones of the MSF and is recovered as an exit fresh water stream. The solvent phase which separates in the hot decanter 51, is cycled through the liquid-liquid extractor 50 and exits therefrom saturated with water and is thereafter recycled through the open condensation zones of the MSF for preheating.

The operations of the processes of this invention which are diagrammed in FIGS. 4, 5 and 6 have open flow condensing zones as described. In each case, it was noted that some of the solvent would always be present in the cold stream 27 going to the condensing zone of the lowest temperature stage, and then passed serially upward to the highest temperature. This solvent was described as present either dissolved in the condensate or also as a separate layer. The same is true in FIG. 10, and both solvent and condensate will here again proceed in open flow through the condensing zones to condense the vapors from the respective flashing zones, and be heated thereby. The process of FIG. 11 uses the closed condensing-heating tubular surface 14a as in FIG. 3 for reheating the solvent from the low to the high temperature of the system. The prime heater 12 is supplied with steam at 33 and the hot solvent and water separated out at the high temperature are passed to the decanter, the water is removed to pass serially through the MSF and is ultimately discharged at 16. The hot solvent layer from 51 passes to the LEX-EX 50 to preheat the sea water entering at 14 to be cooled thereby. As the solvent is cooled, it simultaneously dissolves more water and leaves saturated with water. If it is not cooled as much as possible, an additional counter-current contacting with raw sea water which has its heat rejected to waste will give the lowest possible temperature and the maximum amount of dissolved water in the solvent. This water is separated during the recycle and heating in the condensing tubes of the MSF. The process of FIG. 11 utilizes a solvent which is insoluble in water. If it is not quite insoluble and if some solvent is in a separate layer in the fresh water discharge 16, it may be separated by decantation. If some solvent dissolved, it may be recovered by distillation or another extraction by some other liquid, e.g., kerosene, which is quite insoluble in the water and leaves practically no taste or smell, or by a very light pure naphtha fraction, any residue of which may be readily removed if necessary by stripping, or by simple evaporation.

The apparatus arrangement illustrated in FIG. 12 is particularly adapted for use with solvents which are "cold" extracting, and preferably, those which are quite insoluble in water and vice versa when heated to the maximum temperature prevailing in the system. Less solvent is present in the system due to the substantially complete insolubility of solvent in water at the separation temperature. As will be noted further, the entire temperature range is traversed by the solvent stream in both the LEX 41 and the LEX 50. Thus, the hot solvent entering the bottom of the LEX 50 from the top of the LEX 41 is progressively cooled as it contacts the incoming cold sea water and leaves the top of the LEX 50 saturated with water at the reduced temperature. This solution then enters the bottom of the LEX 41 and is progressively heated as it contacts, counter-currently, the solvent entering the top of the LEX 41 from the hot decanter, 51; and by virtue of the decreased water solubility at the elevated temperatures involved, the solution loses its water component. The latter, containing minor quantities of solvent, is cycled to the open condensation zones of the MSF for preheating. The hot solvent effluent from the top of the LEX 41 is recycled to the bottom of the LEX 50 and the process repeated. The hot brine effluent from the LEX 50 descends the several stages of the MSF and is thereafter discharged as reject or for recycle as is usual. As will be noted further, the entire temperature range of the process is likewise traversed by the fresh water stream in the LEX 41 and the condensing zones of the MSF and by the sea water stream in the LEX 50 and the evaporator zones of the MSF.

As described hereinbefore, the LEX 50 operates as a combined liquid-liquid heat exchanger as well as extractor. In contradistinction the LEX 41 combines the functions of a liquid-liquid heat exchanger and a decanter and does not function as an extractor. Thus, as previously explained, the stream of cold solvent entering the bottom of the LEX 41 will tend to separate out water as it is heated in traversing the LEX 41, this being due to the lower solubility of the water at the successively higher temperatures encountered. Thus, this water component combines with the water component of the solvent layer from the hot decanter, 51, and passes out the bottom of the LEX 41 for recycle to the open condensation zones of the MSF. The lowest point of water solubility in the solvent is at the high temperature of the fresh water condensate leaving the half-stage 19. Thus, the hot decanter 51, is most advantageously positioned in the process to receive directly the high temperature, effluent from the half-stage 19. The fresh water stream withdrawn from the hot decanter 51, may be cooled as a separate stream in the MSF as shown. As a further modification, where the temperature of the stream leaving the top of the LEX 41 is too high relative to the temperature of the incoming sea water in the LEX 50 suitable means may be provided for further cooling the said solvent stream as a means of heat reject. This can be conveniently accomplished for example, by contacting the solvent stream with sea water prior to entering the LEX 50 in addition to the sea water entering at 14 and passing to the MSF, this additional sea water not being heated sufficiently high to warrant recovery of its heat but thereby increasing the solubility of the solvent for water.

As will be evident from the foregoing discussion, in those embodiments involving the use of "cold" extracting solvents, the necessity for stripping operations, e.g., distillation, thereby to recover solvent, is obviated when the solvent employed has little or no appreciable solubility in water at the temperatures employed for decanting. Accordingly, the use of such solvents tends to reduce the costs which would otherwise accrue by virtue of additional heat requirements. The heat supplied to the half-stage can be by steam as previously described.

What is claimed is:

1. A process of heating, flash evaporating, and condensing vapors so formed, of an original aqueous solution, the steps comprising:
    (a) flowing an original aqueous solution as a stream of cooling and condensing liquid through condenser zones of a series of flash evaporation and condensation stages in a direction of increasing pressure and temperature to absorb heat from vapors in each stage, which heat so absorbed is used to preheat said original aqueous solution;
    (b) further heating at least a major part of the said preheated original aqueous solution by heat supplied in a prime heater to raise said original aqueous solution to a maximum temperature higher than the highest temperature in any of said flash evaporation and condensation stages;
    (c) contacting said original aqueous solution with a material which at said maximum temperature acts to change the concentration in the solution of at least some of said components;
    (d) withdrawing the original aqueous solution with the concentration of at least some of its components changed, and passing it serially through evaporation zones of said series of flash evaporation and condensation stages in a direction of decreasing pressure and temperature to flash vaporize a part of the water from said aqueous solution, and to obtain water vapors in each of the respective evaporator zones;
    (e) directing the water vapors obtained in each of the evaporation zones to associated condenser zones in each of said stages; and
    (f) condensing said water vapors to supply heat to the said stream of cooling and condensing liquid as it flows through said condenser zones, the original aqueous solution being diluted prior to being heated in said prime heater by flowing said aqueous solution through said series of condenser zones in open, dispersed flow to allow direct contact condensation thereon of water vapors formed in the associated evaporator zones and to make a combined stream of the condensate formed in said condensation with the original aqueous solution.

2. A process according to claim 1, wherein some part of the water present in the original aqueous solution is evaporated in the prime heater to give water vapors which are condensed in a condenser zone, the condensing in said condenser zone taking place at a higher temperature and pressure than the condensing conditions of temperature and pressure in any condenser zone of any of the said series of evaporation and condensation stages, while heating the said stream of cooling and condensing liquid.

3. A process according to claim 1, wherein said contacting comprises a chemical reaction one product of which is an organic acid; and wherein an alkali is added to neutralize this acid and to form a salt thereof.

4. A process according to claim 1, wherein said contacting comprises a chemical reaction, one product of which is a volatile alkaline compound; and wherein a non-volatile acid is added to react with said alkaline compound.

5. A process according to claim 1, wherein water vapor produced in the evaporation zone of one of the said stages at a lower pressure and temperature:
   (a) is removed from said zone, and is compressed to a pressure at least as high as that of the prime heater; and
   (b) is condensed to furnish at least a part of the heat supplied to the process.

6. A process according to claim 1, wherein said prime heater is a condensing zone for steam, said condensing taking place at a temperature higher than the highest temperature of the condensing zone in any of said flash evaporation and condensation stages.

7. A process according to claim 1, wherein the said original aqueous solution is maintained for a period of from 2 to 40 minutes before the said contacting at an elevated temperature.

8. A process according to claim 7, where the said original aqueous solution is maintained for a period of from 2 to 40 minutes in one of said condenser zones.

9. A process according to claim 6 wherein said material itself acts in said solution to produce said further heating.

10. A process according to claim 1, wherein said contacting comprises adding oxygen to an activated particulate material containing impurities of oxidizable organic matter adsorbed thereon contained in the said original aqueous solution so as to produce a controlled wet combustion of the impurities of the oxidizable organic matter, but not of the activated particulate material itself.

11. A process according to claim 1, wherein the activated particulate material is an activated carbon.

12. A process according to claim 1, wherein said contacting comprises adding oxygen to oxidizable organic matter contained in the said original aqueous solution to produce wet combustion.

13. A process according to claim 12, wherein said oxidizable organic matter contains sewage waste.

14. A process according to claim 12, wherein said oxidizable organic matter is peat.

15. A process according to claim 12, wherein said oxidizable organic matter is a residue in suspension-solution from the pulping of ligno-cellulose material.

16. A process according to claim 12, wherein the said original aqueous solution has a substantial residence time in one of the said condenser zones, to allow at least a partial hydrolysis of some of the said oxidizable organic matter.

17. A process according to claim 12, wherein said wet combustion is controlled to produce a particulate solid having a percentage content of fixed carbon which is higher than that of the said oxidizable organic matter.

18. A process according to claim 17, wherein the said particulate solid having a higher percentage content of fixed carbon than that of the original oxidizable organic matter, has a substantial activity in adsorbing other chemical compounds.

19. Process according to claim 12, wherein the said original aqueous solution contains, in addition to oxidizable organic matter, a highly carbonaceous particulate matter.

20. Process according to claim 19, wherein the said wet combustion is controlled to oxidize the said oxidizable organic matter but not the particulate, highly carbonaceous particulate matter.

21. A process of heating, flash evaporating, and condensing vapors so formed, of an original aqueous solution, the steps comprising:
   (a) flowing an original aqueous solution as a stream of cooling and condensing liquid through condenser zones of a series of flash evaporation and condensation stages in a directon of increased pressure and temperature to absorb heat from vapors in each stage, which heat so absorbed is used to preheat said original aqueous solution;
   (b) further heating at least a major part of the said preheated original aqueous solution by heat supplied in a prime heater to raise said original aqueous solution to a maximum temperature higher than the highest temperature in any of said flash evaporation and condensation stages;
   (c) adding oxygen to oxidizable organic matter contained in said original aqueous solution to produce wet combustion said maximum temperature to change the concentration in the solution of at least some of its component and adding an alkali to neutralize acid products of said wet combustion and to form a salt thereof;
   (d) withdrawing the original aqueous solution with the concentration of its components changed after the reaction, and passing it serially through evaporation zones of said series of flash evaporation and condensation stages in a direction of decreasing pressure and temperature to flash vaporize a part of the water from said aqueous solution, and to obtain water vapors in each of the respective evaporator zones;
   (e) directing the water vapors obtained in each of the evaporation zones to associated condenser zones in each of said stages; and
   (f) condensing said water vapors to supply heat to the said stream of cooling and condensing liquid as it flows through said condenser zones, the original aqueous solution being diluted prior to being heated in said prime heater by flowing said aqueous solution through said series of condenser zones in open, dispersed flow to allow direct contact condensation thereon of water vapors formed in the associated evaporator zones and to make a combined stream of the condensate formed in said condensation with the original aqueous solution.

22. A process of heating, flash evaporating, and condensing vapors so formed, of an original aqueous solution, the steps comprising:
   (a) flowing an original aqueous solution as a stream of cooling and condensing liquid through condenser zones of a series of flash evaporation and condensation stages in a direction of increased pressure and temperature to absorb heat from vapors in each stage, which heat so absorbed is used to preheat said original aqueous solution;
   (b) further heating at least a major part of the said preheated original aqueous solution by heat supplied in a prime heater to raise said original aqueous solution to a maximum temperature higher than the highest temperature in any of said flash evaporation and condensation stages;
   (c) said further heating being obtained by adding oxygen to oxidizable organic matter contained in said original aqueous solution to produce wet combustion to change the concentration in the solution of at least some of its components, and adding a nonvolatile acid to react with volatile alkaline compounds formed as products of said wet combustion;

(d) withdrawing the original aqueous solution with the concentration of its components changed after the wet combustion, and passing it serially through evaporation zones of said series of flash evaporation and condensation stages in a direction of decreasing pressure and temperature to flash vaporize a part of the water from said aqueous solution, and to obtain water vapors in each of the respective evaporator zones;

(e) directing the water vapors obtained in each of the evaporation zones to associated condenser zones in each of said stages; and (f) condensing said water vapors to supply heat to the said stream of cooling and condensing liquid as it flows through said condenser zones, the original aqueous solution being diluted prior to being heated in said prime heater by flowing said aqueous solution through said series of condenser zones in open, dispersed flow to allow direct contact condensation thereon of water vapors formed in the associated evaporator zones and to make a combined stream of the condensate formed in said condensation with the original aqueous solution.

23. A process of heating, flash evaporating, and condensing vapors so formed, of an original aqueous solution, the steps comprising:

(a) flowing an original aqueous solution as a stream of cooling and condensing liquid through condenser zones of a series of flash evaporation and condensation stages in a direction of increased pressure and temperature to absorb heat from vapors in each stage, which heat so absorbed is used to preheat said original aqueous solution;

(b) further heating at least a major part of the said preheated original aqueous solution by heat supplied in a prime heater to raise said original aqueous solution to a maximum temperature higher than the highest temperature in any of said flash evaporation and consensation stages;

(c) contacting said original aqueous solution with a material which acts at said maximum temperature to change the concentration in the solution of at least some of said components;

(d) withdrawing the original aqueous solution with the concentration of its components changed and passing it serially through evaporation zones of said series of flash evaporation and condensation stages in a direction of decreasing pressure and temperature to flash vaporize a part of the water from said aqueous solution, and to obtain water vapors in each of the respective evaporator ones.

(e) directing the water vapors obtained in each of the evaporation zones to associated condenser zones in each of said stages; and (f) condensing said water vapors to supply heat to the said stream of cooling and condensing liquid as it flows through said condenser zones, the material with which said original aqueous solution is contacted comprising a liquid solvent capable of extracting some part of the water of said original aqueous solution wherein said liquid-solvent:

(1) has a greater solubility for water when cold than when hot;

(2) is heated to substantially the highest temperature of the process to separate out water and thereafter said solvent; and (3) heats by direct liquid-liquid contact said original aqueous solution and as it is cooled by such contact extracts water from said original aqueous solution.

24. A process according to claim 23, wherein the said heat supplied to a prime heater is supplied to the said liquid solvent which then transfers the heat to the said original aqueous solution.

25. A process according to claim 23, wherein said heat supplied to a prime heater is supplied to the said liquid solvent before water is removed therefrom.

26. A process according to claim 24, wherein the said heat is supplied by the condensation of steam in direct contact with said liquid solvent.

27. A process according to claim 23, wherein said solvent comprises triethylamine.

28. A process according to claim 23, wherein said stream of fluid flows through condenser tubes in said condensation zones.

29. A process according to claim 23, wherein said liquid solvent containing extracted water is preheated by direct contact with condensing water vapor in each of said condensation zones said liquid solvent containing extracted water being obtained by direct, liquid-liquid counter-current contacting of said liquid solvent with said original aqueous solution.

30. A process of heating, flash evaporating, and condensing vapors so formed, of an original aqueous solution, the steps comprising:

(a) flowing an original aqueous solution as a stream of cooling and condensing liquid through condenser zones of a series of flash evaporation and condensation stages in a direction of increased pressure and temperature to absorb heat from vapors in each stage, which heat so absorbed is used to preheat said original aqueous solution;

(b) further heating at least a major part of the said preheated original aqueous solution by heat supplied in a prime heater to raise said original aqueous solution to a maximum temperature higher than the highest temperature in any of said flash evaporation and condensation stages;

(c) contacting said original aqueous solution with a material which acts at said maximum temperature on selected components of said solution to change the concentration in the solution of at least some of said components;

(d) withdrawing the original aqueous solution with the concentration of its components changed, and passig it serially through evaporation zones of said series of flash evaporation of decreasing pressure and temperature to flash vaporize a part of the water from said aqueous solution, and to obtain water vapors in each of the respective evaporator zones;

(e) directing the water vapors obtained in each of the evaporation zones to associated condenser zones in each of said stages; and (f) condensing said water vapors to supply heat to the said stream of cooling and condensing liquid as it flows through said condenser zones, a part of the water of the said original aqueous solution being extracted at substantially the said maximum temperature by a solvent liquid which has a higher solubility for water at the highest temperature than it does at a lower temperature encountered in the system, the said flowing of the original aqueous solution through the said series of water-vapor-condensing zones being through closed channels, on the surfaces of which the said water vapors formed in the said respective plural stages are being condensed to heat the said original aqueous solution which, in each stage, is at a relatively lower temperature than the corresponding water vapors formed in that stage.

31. A process according to claim 30, wherein said solvent comprises kerosene.

32. A process according to claim 25, wherein said solvent comprises n-butanol.

33. A process of heating, flash evaporating, and condensing vapors so formed, of an original aqueous solution, the steps comprising:
- (a) flowing an original aqueous solution as a stream of cooling and condensing liquid through condenser zones of a series of flash evaporation and condensation stages in a direction of increased pressure and temperature to absorb heat from vapors in each stage, which heat so absorbed is used to preheat said original aqueous solution;
- (b) further heating at least a major part of the said preheated original aqueous solution by heat supplied in a prime heater to raise said original aqueous solution to a maximum temperature higher than the highest temperature in any of said flash evaporation and condensation stages;
- (c) contacting said original aqueous solution with a material which acts at said maximum temperature to change the concentration in the solution of at least some of said components;
- (d) withdrawing the original aqueous solution with the concentration of its components changed after the reaction, and passing it serially through evaporation zones of said series of flash evaporation and condensation stages in a direction of decreasing pressure and temperature to flash vaporize a part of the water from said aqueous solution, and to obtain water vapors in each of the respective evaporator zones;
- (e) directing the water vapors obtained in each of the evaporation zones to associated condenser zones in each of said stages; and
- (f) condensing said water vapors to supply heat to the said stream of cooling and condensing liquid as it flows through said condenser zones, said stream of cooling and condensing liquid being a stream of condensate water maintained at temperatures below its boiling points at the pressures prevailing in the respective condensing zones; said stream of condensate water being directly contacted with the said water vapors formed in the respective evaporation zones to condense the water vapors and to form a combined stream of condensate water therewith; and
- (g) contacting the combined stream of condensate water, leaving the condenser zone of the hgihest temperature, with a heat carrier liquid of limited water miscibility so as to heat the heat carrier liquid by direct liquid-liquid contact, while the condensate system is being cooled;
- (h) cooling said heat carrier liquid from its high temperature, by contacting it with the original aqueous solution to heat the original aqueous solution by direct liquid-liquid contact;
- (i) said material with which said original aqueous solution is contacted comprises a liquid solvent having a greater solubility for water at a higher temperature, and said solvent is used in extracting some part of the water of said heated stream of original aqueous solution; and
- (j) cooling the water-containing solvent to separate out at least a part of the dissolved water.

34. A process according to claim 33, wherein a single liquid is used both as the heat carrier liquid and as the liquid-solvent.

35. A process according to claim 34, wherein the flow of said single liquid is through the heat interchanging cycle of steps and the extraction and cooling cycle in series.

References Cited
UNITED STATES PATENTS

| | | |
|---|---|---|
| 3,119,752 | 1/1964 | Checkovich. |
| 3,152,053 | 10/1964 | Lynam. |
| 3,165,452 | 1/1965 | Williams. |
| 3,215,189 | 11/1965 | Bauer. |
| 3,249,517 | 5/1966 | Lockman. |
| 3,298,932 | 1/1967 | Bauer. |
| 3,299,942 | 1/1967 | Jacoby. |
| 3,323,575 | 6/1967 | Greenfield. |
| 3,334,024 | 8/1967 | Zahavi. |
| 3,351,120 | 11/1967 | Goldner et al. |
| 3,392,089 | 7/1968 | Guptill et al. _____ 203—7 |
| 3,446,711 | 5/1969 | Rosenstein et al. _____ 202—234 |
| 3,377,273 | 4/1968 | Glueckauf _____ 203—7 X |
| 3,399,975 | 9/1968 | Otten _____ 203—7 X |

NORMAN YUDKOFF, Primary Examiner

D. EDWARDS, Assistant Examiner

U.S. Cl. X.R.

159—16 A; 202—173, 185 A, 234, 235; 203—7, 25, 100